(12) United States Patent  (10) Patent No.: US 8,780,804 B2
Pan  (45) Date of Patent: *Jul. 15, 2014

(54) PROVIDING COMMUNICATIONS USING A DISTRIBUTED MOBILE ARCHITECTURE

(75) Inventor: Shaowei Pan, Kildeer, IL (US)

(73) Assignee: Lemko Corporation, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/309,003

(22) Filed: Dec. 20, 2011

(65) Prior Publication Data

US 2012/0106454 A1    May 3, 2012

Related U.S. Application Data

(63) Continuation of application No. 12/425,147, filed on Apr. 16, 2009, now Pat. No. 8,089,920, which is a continuation of application No. 10/983,516, filed on Nov. 8, 2004, now Pat. No. 7,539,158.

(51) Int. Cl.
*H04W 4/00* (2009.01)
(52) U.S. Cl.
USPC ............ 370/328; 370/338; 370/465; 455/560
(58) Field of Classification Search
None
See application file for complete search history.

(56) References Cited

U.S. PATENT DOCUMENTS

| | | | |
|---|---|---|---|
| 4,284,848 A | 8/1981 | Frost | |
| 5,590,175 A | 12/1996 | Gallant et al. | |
| 5,623,495 A | 4/1997 | Eng et al. | |
| 5,734,979 A | 3/1998 | Lu et al. | |
| 5,933,784 A | 8/1999 | Gallagher et al. | |
| 5,991,639 A | 11/1999 | Rautiola et al. | |
| 6,122,499 A | 9/2000 | Magnusson | |
| 6,131,038 A | 10/2000 | Sekine | |
| 6,141,564 A | 10/2000 | Bruner et al. | |
| 6,160,804 A | 12/2000 | Ahmed et al. | |
| 6,411,825 B1 | 6/2002 | Csapo et al. | |
| 6,418,308 B1 | 7/2002 | Heinonen et al. | |
| 6,421,325 B1 | 7/2002 | Kikinis | |
| 6,515,985 B2 | 2/2003 | Shmulevich et al. | |
| 6,539,237 B1 | 3/2003 | Sayers et al. | |

(Continued)

FOREIGN PATENT DOCUMENTS

| CN | 1538781 A | 10/2004 |
|---|---|---|
| CN | 101044769 A | 9/2007 |

(Continued)

OTHER PUBLICATIONS

Hoffpauir, US Registration H1,918, entitled "Integrated Authentication Center and Method for Authentication in a Wireless Telecommunications Network", filed Feb. 19, 1998, 19 pages.

(Continued)

*Primary Examiner* — Michael J Moore, Jr.
(74) *Attorney, Agent, or Firm* — Toler Law Group, PC

(57) ABSTRACT

A method includes receiving a call at a distributed mobile architecture (DMA) server. The DMA server includes a mobile switching center (MSC) module, a wireless transceiver, and a base station controller (BSC). The MSC module includes an authentication, authorization, and accounting (AAA) module configured to support generation of call detail records at the DMA server. The method includes routing the call from the DMA server to a communication device. The method further includes generating a call detail record associated with the call at the DMA server.

20 Claims, 16 Drawing Sheets

(56) References Cited

U.S. PATENT DOCUMENTS

| | | | |
|---|---|---|---|
| 6,542,497 B1 | 4/2003 | Curry et al. | |
| 6,549,937 B1 | 4/2003 | Auerbach et al. | |
| 6,584,098 B1 | 6/2003 | Dutnall | |
| 6,611,533 B1 | 8/2003 | Liao et al. | |
| 6,614,784 B1 | 9/2003 | Glitho et al. | |
| 6,647,426 B2 | 11/2003 | Mohammed | |
| 6,678,155 B1 | 1/2004 | Bresniker | |
| 6,694,134 B1 | 2/2004 | Lu et al. | |
| 6,697,355 B1 | 2/2004 | Lim | |
| 6,704,409 B1 | 3/2004 | Dilip et al. | |
| 6,731,932 B1 | 5/2004 | Rune et al. | |
| 6,735,184 B1 | 5/2004 | Davidson et al. | |
| 6,751,207 B1 | 6/2004 | Lee et al. | |
| 6,760,325 B1 | 7/2004 | Hameleers et al. | |
| 6,763,226 B1 | 7/2004 | McZeal, Jr. | |
| 6,763,233 B2 | 7/2004 | Bharatia | |
| 6,791,988 B1 | 9/2004 | Hameleers et al. | |
| 6,795,444 B1 | 9/2004 | Vo et al. | |
| 6,807,431 B2 | 10/2004 | Sayers et al. | |
| 6,807,432 B2 | 10/2004 | Hwang | |
| 6,816,706 B1 | 11/2004 | Hohnstein et al. | |
| 6,819,652 B1 | 11/2004 | Akhtar et al. | |
| 6,829,473 B2 | 12/2004 | Raman et al. | |
| 6,831,903 B2 | 12/2004 | Kang | |
| 6,839,356 B2 | 1/2005 | Barany et al. | |
| 6,859,652 B2 | 2/2005 | Karabinis et al. | |
| 6,871,072 B1 | 3/2005 | Meche | |
| 6,879,582 B1 | 4/2005 | Dhara et al. | |
| 6,879,677 B2 | 4/2005 | Trandal | |
| 6,917,813 B2 | 7/2005 | Elizondo | |
| 6,937,708 B2 | 8/2005 | Hirose | |
| 6,958,983 B2 | 10/2005 | Musikka et al. | |
| 6,985,454 B1 | 1/2006 | Wiedeman et al. | |
| 7,003,286 B2 | 2/2006 | Brown et al. | |
| 7,050,414 B2 | 5/2006 | Lin | |
| 7,054,307 B2 | 5/2006 | Papadimitriou et al. | |
| 7,054,322 B2 | 5/2006 | D'Annunzio et al. | |
| 7,072,650 B2 | 7/2006 | Stanforth | |
| 7,117,015 B2 | 10/2006 | Scheinert et al. | |
| 7,120,435 B2 | 10/2006 | Usher et al. | |
| 7,120,436 B2 | 10/2006 | Kim | |
| 7,133,670 B1 | 11/2006 | Moll et al. | |
| 7,133,923 B2 | 11/2006 | MeLampy et al. | |
| 7,136,651 B2 | 11/2006 | Kalavade | |
| 7,154,901 B2 | 12/2006 | Chava et al. | |
| 7,158,621 B2 | 1/2007 | Bayne | |
| 7,171,216 B1 | 1/2007 | Choksi | |
| 7,299,039 B2 | 11/2007 | Lee et al. | |
| 7,313,399 B2 | 12/2007 | Rhee et al. | |
| 7,324,478 B2 | 1/2008 | Park et al. | |
| 7,328,268 B1 | 2/2008 | Foltak et al. | |
| 7,346,334 B2 | 3/2008 | Gaeta et al. | |
| 7,349,412 B1 | 3/2008 | Jones et al. | |
| 7,359,700 B2 | 4/2008 | Swensen et al. | |
| 7,383,042 B2 | 6/2008 | Lamb et al. | |
| 7,385,947 B2 | 6/2008 | Wu et al. | |
| 7,406,069 B2 | 7/2008 | Yashar et al. | |
| 7,424,313 B2 | 9/2008 | Ham et al. | |
| 7,486,967 B2 | 2/2009 | Pan et al. | |
| 7,490,132 B1 | 2/2009 | Lyle et al. | |
| 7,522,632 B2 | 4/2009 | La Porta et al. | |
| 7,536,170 B2 | 5/2009 | Goldman et al. | |
| 7,539,158 B2 * | 5/2009 | Pan | 370/328 |
| 7,548,763 B2 * | 6/2009 | Pan | 455/561 |
| 7,552,670 B2 | 6/2009 | Goldman et al. | |
| 7,606,594 B2 | 10/2009 | Jesse et al. | |
| 7,653,414 B2 | 1/2010 | Pan | |
| 7,738,488 B2 | 6/2010 | Marsico et al. | |
| 7,760,695 B2 | 7/2010 | Gopalakrishnan et al. | |
| 7,787,879 B1 | 8/2010 | Philips et al. | |
| 7,840,230 B2 * | 11/2010 | Pan | 455/519 |
| 7,855,988 B2 | 12/2010 | Pan | |
| 7,856,233 B2 | 12/2010 | Pan | |
| 7,979,066 B2 | 7/2011 | Pan | |
| 8,036,158 B2 * | 10/2011 | Pan et al. | 370/328 |
| 8,046,420 B2 | 10/2011 | Pan | |
| 8,089,920 B2 * | 1/2012 | Pan | 370/328 |
| 8,107,409 B2 | 1/2012 | Pan | |
| 8,224,322 B2 | 7/2012 | Pan | |
| 8,310,990 B2 | 11/2012 | Pan | |
| 8,359,029 B2 | 1/2013 | Pan | |
| 2001/0013050 A1 | 8/2001 | Shah | |
| 2001/0036173 A1 | 11/2001 | Shmulevich et al. | |
| 2001/0046859 A1 | 11/2001 | Kil | |
| 2001/0055298 A1 | 12/2001 | Baker et al. | |
| 2002/0009060 A1 | 1/2002 | Gross | |
| 2002/0015392 A1 | 2/2002 | Musikka et al. | |
| 2002/0016180 A1 | 2/2002 | Derosier et al. | |
| 2002/0045444 A1 | 4/2002 | Usher et al. | |
| 2002/0051518 A1 | 5/2002 | Bondy et al. | |
| 2002/0058502 A1 | 5/2002 | Stanforth | |
| 2002/0061746 A1 | 5/2002 | Jo et al. | |
| 2002/0160772 A1 | 10/2002 | Gailey et al. | |
| 2002/0169887 A1 | 11/2002 | MeLampy et al. | |
| 2003/0048766 A1 | 3/2003 | D'Annunzio et al. | |
| 2003/0063721 A1 | 4/2003 | Hirose | |
| 2003/0088698 A1 | 5/2003 | Singh et al. | |
| 2003/0092441 A1 | 5/2003 | Taha et al. | |
| 2003/0096628 A1 | 5/2003 | Bar-On et al. | |
| 2003/0100302 A1 | 5/2003 | Armbruster et al. | |
| 2003/0100342 A1 | 5/2003 | Ham et al. | |
| 2003/0112748 A1 | 6/2003 | Puppa et al. | |
| 2003/0153343 A1 | 8/2003 | Crockett et al. | |
| 2003/0186694 A1 | 10/2003 | Sayers et al. | |
| 2003/0198325 A1 | 10/2003 | Bayne | |
| 2004/0014466 A1 | 1/2004 | Jesse et al. | |
| 2004/0018829 A1 | 1/2004 | Raman et al. | |
| 2004/0019539 A1 | 1/2004 | Raman et al. | |
| 2004/0156495 A1 | 8/2004 | Chava et al. | |
| 2004/0203621 A1 | 10/2004 | Brown et al. | |
| 2004/0203677 A1 | 10/2004 | Brown et al. | |
| 2004/0204097 A1 | 10/2004 | Scheinert et al. | |
| 2004/0253949 A1 | 12/2004 | Swensen et al. | |
| 2004/0253984 A1 | 12/2004 | Csapo et al. | |
| 2004/0259556 A1 | 12/2004 | Czys | |
| 2005/0044152 A1 | 2/2005 | Hardy et al. | |
| 2005/0064922 A1 | 3/2005 | Owens et al. | |
| 2005/0070278 A1 | 3/2005 | Jiang | |
| 2005/0075106 A1 | 4/2005 | Jiang | |
| 2005/0091392 A1 | 4/2005 | Gesswein et al. | |
| 2005/0176413 A1 | 8/2005 | Lee et al. | |
| 2005/0250491 A1 | 11/2005 | Roy | |
| 2006/0026252 A1 | 2/2006 | Caspi et al. | |
| 2006/0046714 A1 | 3/2006 | Kalavade | |
| 2006/0046760 A1 | 3/2006 | Bertino et al. | |
| 2006/0047836 A1 | 3/2006 | Rao et al. | |
| 2006/0052113 A1 | 3/2006 | Ophir et al. | |
| 2006/0063544 A1 | 3/2006 | Zhao et al. | |
| 2006/0098661 A1 | 5/2006 | Pan | |
| 2006/0114934 A1 | 6/2006 | Shin et al. | |
| 2006/0141984 A1 | 6/2006 | Taglienti et al. | |
| 2006/0142011 A1 | 6/2006 | Kallio | |
| 2006/0148465 A1 | 7/2006 | Perdomo et al. | |
| 2006/0159039 A1 | 7/2006 | Jung et al. | |
| 2006/0203746 A1 | 9/2006 | Maggenti et al. | |
| 2006/0217121 A1 | 9/2006 | Soliman et al. | |
| 2006/0221912 A1 | 10/2006 | Olivier et al. | |
| 2006/0234747 A1 | 10/2006 | Pan | |
| 2006/0234774 A1 | 10/2006 | Pan et al. | |
| 2006/0258358 A1 | 11/2006 | Kallio | |
| 2007/0008968 A1 | 1/2007 | Baker et al. | |
| 2007/0010245 A1 | 1/2007 | Levitan | |
| 2007/0021097 A1 | 1/2007 | Gaeta et al. | |
| 2007/0021118 A1 | 1/2007 | Ophir | |
| 2007/0060124 A1 | 3/2007 | Kalavade | |
| 2007/0076697 A1 | 4/2007 | Huotari et al. | |
| 2007/0087738 A1 | 4/2007 | Melkesetian | |
| 2007/0147598 A1 | 6/2007 | Somes et al. | |
| 2007/0202847 A1 | 8/2007 | Pan | |
| 2007/0213075 A1 | 9/2007 | Jiang | |
| 2007/0230352 A1 | 10/2007 | Kokku et al. | |
| 2007/0232267 A1 | 10/2007 | Pan | |
| 2007/0232304 A1 | 10/2007 | Goldman et al. | |
| 2007/0234892 A1 | 10/2007 | Goldman et al. | |

(56) References Cited

U.S. PATENT DOCUMENTS

| | | | |
|---|---|---|---|
| 2007/0243891 | A1 | 10/2007 | Civanlar et al. |
| 2007/0271606 | A1 | 11/2007 | Amann et al. |
| 2007/0287452 | A1 | 12/2007 | Pan |
| 2007/0291910 | A1 | 12/2007 | Bucchieri et al. |
| 2007/0293216 | A1 | 12/2007 | Jiang |
| 2008/0039144 | A1 | 2/2008 | Pan et al. |
| 2008/0080438 | A1 | 4/2008 | Gopalakrishnan et al. |
| 2008/0101314 | A1 | 5/2008 | Bachmutsky |
| 2008/0101410 | A1 | 5/2008 | Barkley et al. |
| 2008/0134295 | A1 | 6/2008 | Bailey et al. |
| 2008/0146158 | A1 | 6/2008 | Pan et al. |
| 2008/0168523 | A1 | 7/2008 | Ansari et al. |
| 2008/0244014 | A1 | 10/2008 | Britton et al. |
| 2009/0003269 | A1 | 1/2009 | Kumazawa et al. |
| 2009/0022155 | A1 | 1/2009 | Rosenberg et al. |
| 2009/0031244 | A1 | 1/2009 | Brezina et al. |
| 2009/0067441 | A1 | 3/2009 | Ansari et al. |
| 2009/0156213 | A1 | 6/2009 | Spinelli et al. |
| 2009/0186626 | A1 | 7/2009 | Raghothaman |
| 2009/0215449 | A1 | 8/2009 | Avner |
| 2009/0227230 | A1 | 9/2009 | Camilleri et al. |
| 2009/0227235 | A1 | 9/2009 | Pan |
| 2009/0228555 | A1 | 9/2009 | Joviak et al. |
| 2009/0270097 | A1 | 10/2009 | Gallagher et al. |
| 2009/0271491 | A1 | 10/2009 | Pan |
| 2009/0292785 | A1 | 11/2009 | Leedberg et al. |
| 2009/0325584 | A1 | 12/2009 | Pan |
| 2009/0327819 | A1 | 12/2009 | Pan |
| 2010/0008306 | A1 | 1/2010 | Pan |
| 2010/0008369 | A1 | 1/2010 | Pan |
| 2010/0048197 | A1 | 2/2010 | Jiang |
| 2010/0048208 | A9 | 2/2010 | Gunaratnam et al. |
| 2010/0057485 | A1 | 3/2010 | Luft |
| 2010/0057732 | A1 | 3/2010 | O'Sullivan et al. |
| 2010/0075668 | A1 | 3/2010 | Pan |
| 2010/0080214 | A1 | 4/2010 | Li et al. |
| 2010/0094878 | A1 | 4/2010 | Soroca et al. |
| 2010/0199340 | A1 | 8/2010 | Jonas et al. |
| 2010/0217809 | A1 | 8/2010 | Vymenets et al. |
| 2010/0217837 | A1 | 8/2010 | Ansari et al. |
| 2011/0059740 | A1 | 3/2011 | Pan |
| 2011/0060853 | A1 | 3/2011 | Pan |
| 2011/0223921 | A1 | 9/2011 | Pan |
| 2012/0002607 | A1 | 1/2012 | Pan |
| 2012/0020293 | A1 | 1/2012 | Nix, Jr. et al. |
| 2012/0044908 | A1 | 2/2012 | Spinelli et al. |
| 2012/0094659 | A1 | 4/2012 | Pan |
| 2012/0252444 | A1 | 10/2012 | Pan |
| 2013/0039279 | A1 | 2/2013 | Pan |
| 2013/0065583 | A1 | 3/2013 | Pan |
| 2013/0130677 | A1 | 5/2013 | Pan |
| 2013/0148578 | A1 | 6/2013 | Pan |

FOREIGN PATENT DOCUMENTS

| | | |
|---|---|---|
| EP | 0365885 | 5/1990 |
| GB | 2435751 B | 2/2009 |
| WO | 2006052342 A2 | 5/2006 |
| WO | 2007102003 A1 | 9/2007 |
| WO | 2008150281 A1 | 12/2008 |
| WO | 2009158154 A2 | 12/2009 |
| WO | 2009158155 A2 | 12/2009 |
| WO | 2010005648 A2 | 1/2010 |
| WO | 2010008695 A2 | 1/2010 |
| WO | 2010036439 A2 | 4/2010 |

OTHER PUBLICATIONS

International Preliminary Report on Patentability and Written Opinion received from the International Bureau of WIPO for International Application No. PCT/US2005/035648, dated Nov. 8, 2004, 9 pages.

Notification of the Second Office Action received from the State Intellectual Property Office of the People's Republic of China (SIPO) for Chinese Application No. 200580033404.X, Notification dated Oct. 26, 2010, 12 pages.

The Extended European Search Report (the Supplementary European Search Report and the European Search Opinion) received from the European Patent Office (EPO) for European Application No. 05801092.7-1525/1810465, PCT/US2005035648, dated Jan. 31, 2011, 6 pages.

B.G. Evans and K. Baughan; "Visions of 4G"; Electronics & Communication Engineering Journal; Dec. 2000; pp. 293-303.

Shirshanka Das, Alok Nandan & Giovanni Pau (University of CA, Los Angeles, CA, USA); "SPAWN: A Swarming Protocol for Vehicular Ad-Hoc Wireless Networks"; VANET'04, Oct. 1, 2004, Philadelphia, PA, USA; ACM 1-58113-922-5/04/0010; 2 pgs.

Yu-Chee Tseng, Chia-Ching Shen (National Chiao Tung University) & Wen-Tsuen Chen (National Tsing Hua University); "Integrating Mobile IP with AD Hoc Networks"; IEEE Computer Society; 0018-9162/03; 2003 IEEE; May 2003; pp. 48-55.

Halim Yanikomeroglu, David D. Falconer & Van M. Sreng; "Coverage Enhancement Through Two-Hop Peer-to-Peer Relaying in Cellular Radio Networks"; Broadband Communications and Wireless Systems (BCWS) Centre Department of Systems & Computer Engineering, Carleton University, Ottawa, Canada; WWRF Meeting #7, Eindhoven, the Netherlands, Dec. 3-4, 2002, WG4: Spectrum, New Air Interfaces and Ad-Hoc Networking Multi-Hop Wireless Systems; 10 pages.

Bur Goode; "Voice Over Internet Protocol (VoIP)"; 0018-9219/02 2002 IEEE; Proceedings of the IEEE; vol. 90, No. 9, Sep. 2002; pp. 1495-1517.

Kyung-Hyu Lee, Kyu-Ok Lee & Kwon-Chu Park (Network Research Laboratory ETRI Korea) Jong-Ok Lee and Yoon-Hak Bang (Network Planning Team KT Korea); "Architecture to be Deployed on Strategies of Next-Generation Networks"; 0/7803-7802-4/03 2003 IEEE; pp. 819-822.

Wolfgang Kellerer, Christian Bettstetter, Christian Schwingenschlögl & Peter Sties (Technische Universität München) Karl-Ernst Steinberg (BMW) & Hans-Jörg Vogel (the Fantastic Corp); "(Auto) Mobile Communication in a Heterogeneous and Converged World"; IEEE Personal Communications; Dec. 2001; 1070-9916/01; 2001 IEEE pp. 41-47.

Nilanjan Banerjee & Sajal K. Das (University of Texas, Arlington) & Arup Acharya (IBM T.J. Watson Research Center)' "Peer-to-peer SIP-based Services over Wireless Ad Hoc Networks"; BROADWIM: Broadband Wireless Multimedia Workshop; Oct. 29, 2004—broadnets.org; *This work was supported by NSF under the ORBIT testbed project, grant # NSF NRT Project #ANI-0335244 and by NSF ITR grant IIS-0326505; 8 pages.

Hung-Yu Wei (Columbia University) & Richard D. Gitlin (NEC Laboratories America); "Two-Hop-Relay Architecture for Next-Generation WWAN/WLAN Integration"; 4G Mobile Communications: Toward Open Wireless Architecture; 1536-1284/04 2004 IEEE; IEEE Wireless Communications; Apr. 2004; pp. 2-9.

Wolfgang Kellerer (LKN, Munich University of Technology), Hans-Jörg Vögel (the Fantastic Corp.) & Karl-Ernst Steinberg (BMW); "A Communication Gateway for Infrastructure Independent Wireless Access"; IEEE Communications Magazine; Mar. 2002; vol. 9; No. 3; 6 pages.

Willie W. Lu & Jenny Hu (U.S. Center for Wireless Communications, Stanford University, CA); "Open Wireless Architecture—The Core to 4G Mobile Communications"; China Communications; Apr. 2006; pp. 32-39.

Ralf Pabst, Bernard H. Walke & Daniel C. Schultz (RWTH Aachen University) Patrick Herhold & Gerhard P. Fettweis (Technical University of Dresden) Halim Yanikomeroglu & David D. Falconer (Carleton University) Sayandev Mukherjee & Harish Viswanathan (Lucent Technologies) Matthias Lott & Wolfgang Zirwas (Siemens ICM) Mischa Dohler & Hamid Aghvami (Kings College); "Relay-Based Deployment Concepts for Wireless and Mobile Broadband Radio"; 0163-6804/04; 2004 IEEE; IEEE Communications Magazine; Sep. 2004; pp. 80-89.

Simone Frattasi, Hanane Fathi, Frank H.P. Fitzek & Ramjee Prasad (Aalborg University) Marcos D. Katz (Samsung Electronics); "Defining 4G Technology from the User's Perspective"; IEEE Network; Jan./Feb. 2006; 0890-8044/06; 2006 IEEE; pp. 35-41.

Ian F. Akyildiz (Broadband and Wireless Networking BWN Lab, Georgia Institute of Technology) Xudong Wang & Weilin Wang

(56) References Cited

OTHER PUBLICATIONS (Kiyon, Inc. La Jolla, CA); "Wireless Mesh Networks: A Survey"; Computer Networks 47; Jan. 1, 2005; pp. 445-487; 1389-1286 2004 Elsevier B.V.

Brian Woerner (Virginia Tech, Blacksburg, VA) & Mostofa Howlader (University of Tennessee, Knoxville, TN); "Research Directions for Fourth Generation Wireless"; Proceedings of the 10th IEEE International Workshops on Enabling Technologies: Infrastructure for Collaborative Enterprises (WETICE 2001); Jun. 20-22, 2001; Cambridge, MA, USA; IEEE Computer Society 2001; ISBN 0/7695-1269-0; 2 pages.

"Framework and Overall Objectives of the Future Development of IMT-2000 and Systems Beyond IMT-2000"; International Telecommunication Union; ITU-R Radiocommunication Sector of ITU; Recommendation ITU-R M.1645 (Jun. 2003); M Series; Mobile, Radiodetermination, Amateur and Related Satellite Services; 26 pages.

Notification of First Office Action for Chinese Application No. 200580033404.X, mailed Sep. 16, 2009, 19 pages.

Notification of Third Office Action for Chinese Application No. 200580033404.X, mailed Jan. 6, 2012, 16 pages.

Notification of Fourth Office Action for Chinese Application No. 200580033404.X, mailed Aug. 24, 2012, 16 pages.

Notification of the First Office Action for United Kingdom Application No. GB0706179.9 mailed Sep. 22, 2008, 5 pages.

Notification of First Office Action for Chinese Application No. 200980121864.6, mailed Mar. 27, 2013, 9 pages.

International Search Report and Written Opinion of the International Search Authority for International Application No. PCT/US09/045951 from the International Searching Authority, mailed Dec. 30, 2009, 8 pages.

International Sesarch Report and Written Opinion of the International Search Authority for International Application No. PCT/US09/045957 from the International Searching Authority, mailed Jan. 14, 2010, 8 pages.

International Search Report and Written Opinion of the International Search Authority for International Application No. PCT/US09/045968 from the International Searching Authority, mailed on Jan. 21, 2010, 9 pages.

Notification of First Office Action for Chinese Application No. 200980126758.7, mailed Apr. 28, 2013, 10 pages.

International Search Report and Written Opinion of the International Search Authority for International Application No. PCT/US09/045973 from the International Searching Authority, mailed on Jan. 18, 2010, 10 pages.

Written Opinion of the International Search Authority for International Application No. PCT/US07/25538 from the International Searching Authority, mailed on Sep. 22, 2008, 5 pages.

International Search Report and Written Opinion of the International Search Authority for International Application No. PCT/US09/050522 from the International Searching Authority, mailed on Feb. 1, 2011, 7 pages.

Yu, W. et al., "Reverse Link Capacity Analysis on Distributed Wireless Communication System", Journal of Beijing University of Posts and Telecommunications, Jun. 30, 2004, 4 pages.

\* cited by examiner

PROVIDING COMMUNICATIONS USING A DISTRIBUTED MOBILE ARCHITECTURE

CLAIM OF PRIORITY

The present application claims priority from and is a continuation of U.S. patent application Ser. No. 12/425,147, issued as U.S. Pat. No. 8,089,920, filed on Apr. 16, 2009, and entitled "SYSTEM, METHOD, AND DEVICE FOR PROVIDING COMMUNICATIONS USING A DISTRIBUTED MOBILE ARCHITECTURE," which claims priority from and is a continuation of U.S. patent application Ser. No. 10/983,516, issued as U.s. Pat. No. 7,539,158, filed on Nov. 8, 2004, and entitled "SYSTEM, METHOD, AND DEVICE FOR PROVIDING COMMUNICATIONS USING A DISTRIBUTED MOBILE ARCHITECTURE." The contents of each of the above priority documents are expressly incorporated herein by reference in their entirety.

FIELD OF THE DISCLOSURE

The present disclosure relates generally to the distributed mobile communication systems.

BACKGROUND

Access to basic telephony service is particularly important for rural and isolated communities. Telephony access allows small-scale enterprises, cooperatives, and farmers to obtain accurate information on fair prices for their products and to access regional and national markets. Access also reduces the cost of transportation and supports the local tourist industry. By bringing markets to people via telecommunications, rather than forcing people to leave in search of markets, urban migration is reduced and greater income and employment potential are generated in rural areas.

Unfortunately, the last decade of the telecommunications boom has not alleviated the disparities between urban and rural communities. The average imbalance, in terms of telephone penetration, in Asia, for example, is over ten to one and is often as high as (4) telephone lines per one-hundred (100) inhabitants, e.g., India and Pakistan, has a rural penetration of less than 0.2 per one-hundred (100). The situation is more acute in most African countries and in some parts of Latin America. By comparison, the disparity in average income level between urban and rural residents in the developing world is usually less than 4 to 1.

Current telephone systems are expensive to deploy. For example, a typical cellular system that includes a mobile switching center (MSC), a base station controller (BSC), and a home location register/visitor location register (HLR/VLR) can cost over $2.0 million. Moreover, such a system requires a minimum of ten thousand users in order to be economically viable. In many rural areas, the population is not large enough to support the installation of such a system. Further, in many cases, the conditions in which the equipment, e.g., the MSC, BSC, and HLR/VLR, are to be operated are extremely harsh and environmentally prohibitive. An alternative to such a cellular system can include a wired system, but the costs associated with deploying and maintaining land lines are too high for certain rural areas.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION

In a particular embodiment, a communication apparatus is disclosed that includes a wireless transceiver and a computer readable storage medium. A mobile switching center (MSC) module is embedded in the computer readable storage medium. The MSC module includes an authentication, authorization, and accounting (AAA) module configured to support generation of a set of call detail records at the communication apparatus. A base station controller (BSC) module is also embedded in the computer readable storage medium. The communication apparatus is adapted to transmit Internet Protocol (IP) packet data received at the wireless transceiver to a second apparatus via a wireless peer-to-peer IP connection.

In another particular embodiment, a communication system is disclosed that includes a first communication apparatus and a second communication apparatus. The first communication apparatus includes a first wireless transceiver and a first computer readable storage medium. A first MSC module is embedded in the first computer readable storage medium. The first MSC module includes a first AAA module configured to support generation of a first set of call detail records at the first communication apparatus. A first BSC module is also embedded in the first computer readable storage medium. The second communication apparatus includes a second wireless transceiver and a second computer readable storage medium. A second MSC module is embedded in the second computer readable storage medium. The second MSC module includes a second AAA module configured to support generation of a second set of call detail records at the second communication apparatus. A second BSC module is also embedded in the second computer readable storage medium. The first communication apparatus is adapted to transmit IP packet data received at the first wireless transceiver to the second communication apparatus via a wireless peer-to-peer IP connection. The second communication apparatus is adapted to transmit IP packet data received at the second wireless transceiver to the first communication apparatus via the wireless peer-to-peer IP connection.

In another particular embodiment, a portable communication apparatus is disclosed that includes a wireless transceiver and a computer readable storage medium. An MSC module is embedded in the computer readable storage medium. The MSC module includes an AAA module configured to support generation of a set of call detail records at the portable communication apparatus. A BSC module, a home location register (HLR) module, and a visitor location register (VLR) module are also embedded in the computer readable storage medium. The portable communication apparatus is adapted to transmit IP packet data received at the wireless transceiver to a second apparatus via a wireless peer-to-peer IP connection when the portable communication apparatus is in motion.

Figure 1:
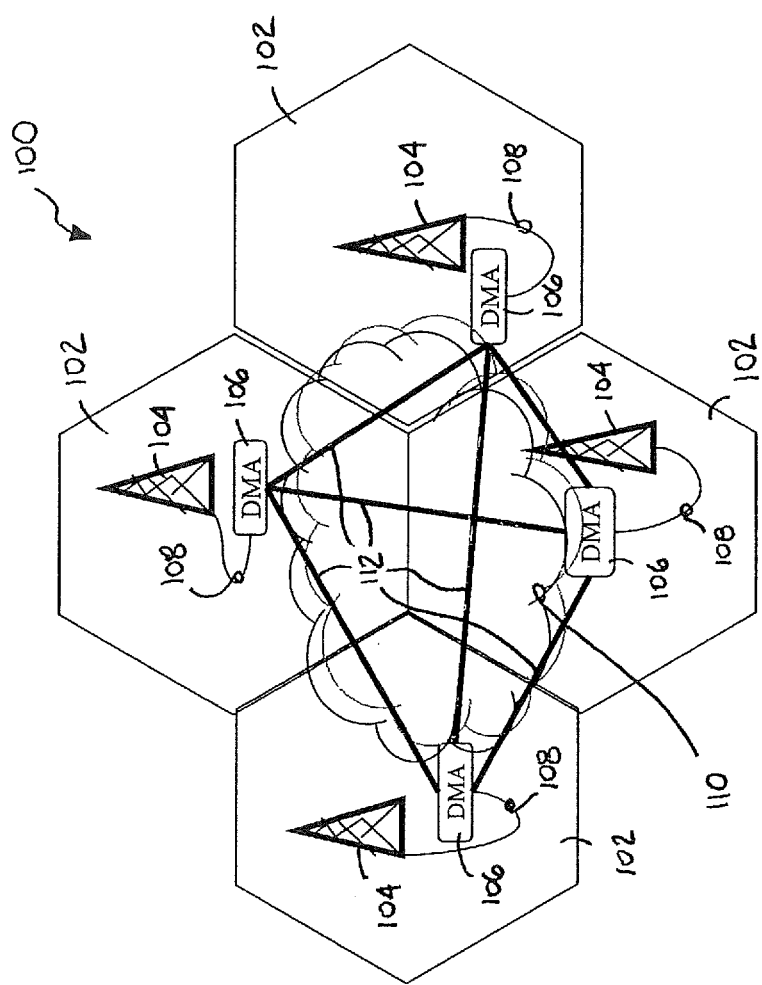
FIG. 1 is a diagram of a distributed and associative communication system.

Referring now to FIG. 1, a non-limiting exemplary embodiment of a distributive and associated telecommunications system is illustrated and is generally designated 100. As depicted in FIG. 1, the system 100 includes four cellular coverage sites 102. Each coverage site 102 includes an antenna 104. In one embodiment, the antenna 104 is connected to a transceiver belonging to a base transceiver station (BTS) and the BTS is a 3-sector BTS. FIG. 1 also indicates that a distributed mobile architecture (DMA) server 106 can be connected to each antenna 104. In one embodiment, each DMA server 106 is physically and directly connected to its respective antenna 104, e.g., by a wire or cable 108.

As illustrated in FIG. 1, each DMA server 106 is interconnected with the other DMA servers 106 via an Internet protocol network 110. As such, there exists a peer-to-peer connection 112 between each DMA server 106 in the system 100. As described in detail below, the DMA servers 106 can handle telephony traffic that is communicated at each antenna 104. For example, the DMA servers 106 can switch and route calls received via each antenna 104. Additionally, the DMA servers 106 can hand-off calls to each other as mobile communication devices move around and between the cellular coverage sites 102. The DMA servers 106 can communicate with each other via the IP network 110 and can further transmit calls to each other via the IP network 110. It should be understood that more than four cellular coverage sites 102 can be included in the system and that the inclusion of only four cellular coverage sites 102 in FIG. 1 is merely for clarity.

Within the distributed and associative telecommunications system 100 the controlling logic can be distributed and de-centralized. Moreover, the wireless coverage provided by the disclosed system 100 is self-healing and redundant. In other words, due to the interconnectivity via the IP network 110, if one or more of the DMA servers 106 loses powers, fails, or is otherwise inoperable, telephony traffic handled by the inoperable DMA server 106 can re-routed to one of the remaining operable DMA servers 106. Additionally, user data stored in a database, e.g., a home location register (HLR) or a visitor location register (VLR), can be distributed equally and fully among all of the DMA servers 106. It can also be appreciated that new cellular coverage sites can be easily added to the system 100 as the demand for users increases. Specifically, a DMA server can be deployed as described below, connected to an antenna, connected to the IP network, and activated to provided cellular coverage in a new area.

Figure 2:
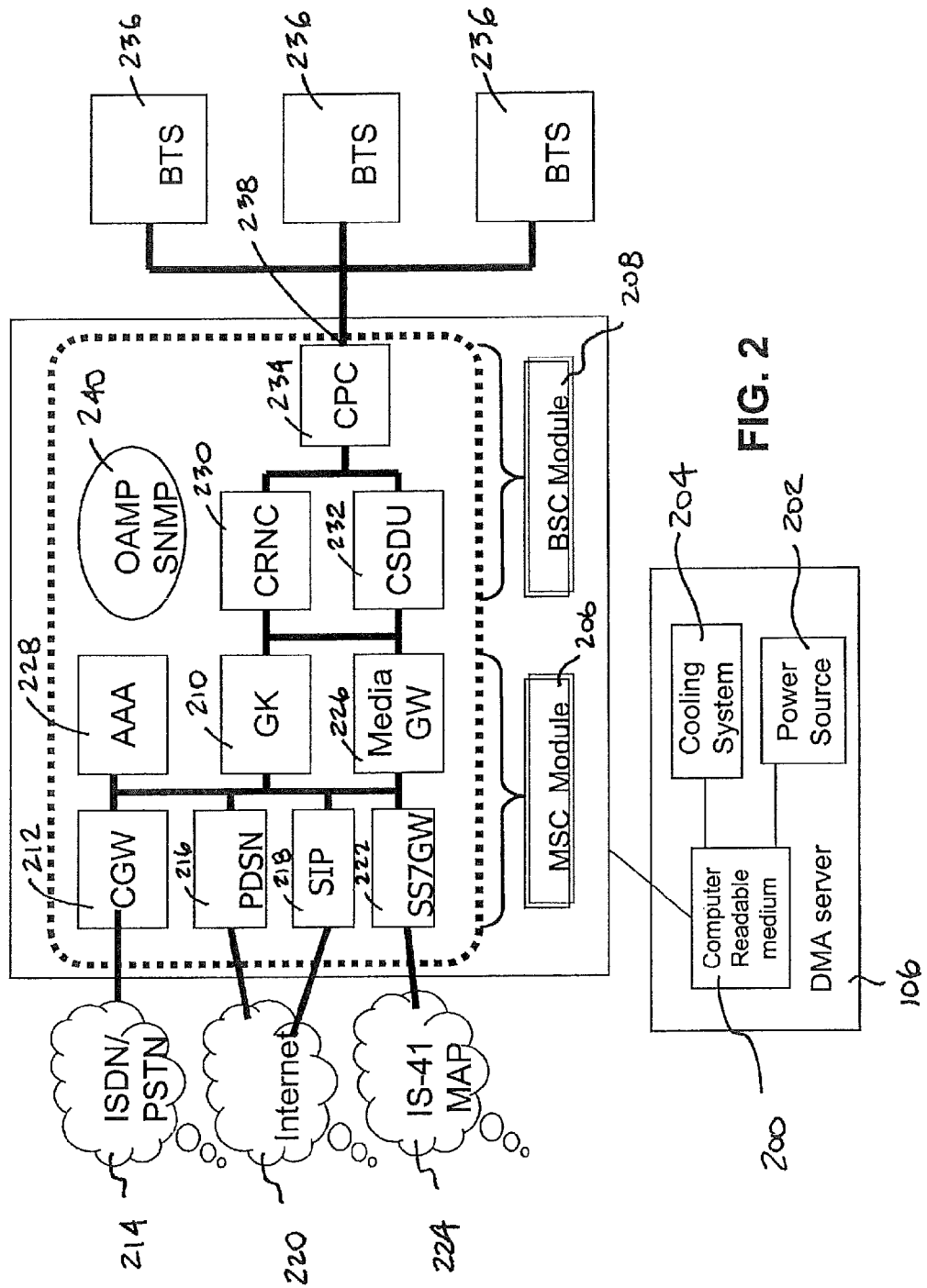
FIG. 2 is a diagram of a distributed management architecture server.

FIG. 2 shows an exemplary, non-limiting embodiment of a DMA server, e.g., one of the DMA servers 106 described in conjunction with FIG. 1. The DMA server 106 is essentially a processor, or computer, having housing and a computer readable medium 200 is disposed therein. A power supply 202 can also be disposed within the housing of the DMA server 106 in order to provide power to the DMA server 106. The power supply 202 can be a rechargeable battery disposed within the DMA server 106 or it can be external to the DMA server 106, i.e., a standard power outlet. Moreover, a cooling system 204, e.g., a fan with a thermostat, can be within the DMA server 106 included in order to keep the DMA server 106 from overheating.

As depicted in FIG. 2, the DMA server 106 can include a mobile switching center (MSC) module 206 and a base station controller (BSC) module 208 embedded within the computer readable medium 200. In an exemplary, non-limiting embodiment, the MSC module 206 can include a gatekeeper (GK) 210 that is connected to several gateways. For example, a circuit gateway (CGW) 212 can be connected to the GK 210 and can provide connectivity to an integrated services digital network/public switched telephone network (ISDN/PSTN) interface 214. The CGW 212 can provide a circuit switched to packet data conversion. In an exemplary, non-limiting embodiment, the PSTN portion of the ISDN/PSTN interface 214 can be an inter-office interface that uses the Bellcore industry standard ISDN user part (ISUP) signaling on a signaling system seven (SS7) link set. Moreover, the voice trunks on this interface can be timeslots on a T1 connection. Inbound and outbound voice calls can be supported on the ISDN portion of the ISDN/PSTN interface 214.

As further illustrated in FIG. 2, a packet data server node (PDSN) gateway 216 for CDMA or a Gateway GPRS Support Node (GGSN) for GSM and a Session Initiation Protocol (SIP) gateway 218 can also be connected to the GK 210. The PDSN gateway 216 and the SIP gateway 218 can provide connectivity to an Internet protocol (IP) interface 220. Further, the PDSN gateway 216 or a GGSN can establish a reverse tunnel with the PDSN or GGSN gateway 216 using generic routing encapsulation (GRE). Moreover, the PDSN gateway 216 or GGSN can implement the Pseudo Random Function (PRF)/Foreign Agent (FA) functionality of the DMA server 106 which supports mobile IP functions.

FIG. 2 further shows an SS7 gateway 222 that provides connectivity to an ANSI-41 and GSM MAP interface 224. In a particular embodiment, the ANSI-41 interface can be an SS7 TCAP/SCCP interface on the same SS7 link set used for ISUP signaling. The same SS7 point code can be used to identify the DMA server 106 in the ANSI-41 network. The ANSI-41 interface can be used for roamer registration only. Further, in an exemplary, non-limiting embodiment, the GSM MAP interface can be an SS7 TCAP/SCCP interface on the same SS7 link set used for ISUP signaling. It can be appreciated that there are different protocols of MAP from MAP/B to MAP/I, but in the illustrative embodiment, the different MAP/x protocols are not stacked—they are used independently.

As depicted in FIG. 2, a media gateway 226 can also be connected to the GK 210. In an exemplary, non-limiting embodiment, the media gateway 226 can include cellular transcoders, one or more intranet gateways, conferencing bridges, and group calling functionality. Further, an authentication, authorization, and accounting (AAA) module 228 can be connected to the GK 210. In an exemplary, non-limiting embodiment, there are three levels of authentication management. The highest level is for administration, the mid-level is for operations, and the lowest level is for normal users. The functions of the AAA module 228 can be included in the user level.

In an exemplary, non-limiting embodiment, the GK 210 can act as an AAA server and a feather server, which supports advanced supplementary service, short message service, etc. Moreover, the GK 210 can act as a call manager and can support ISUP and PSTN function calls. Additionally, the GK 210 can act as a signal gateway, e.g., IP to SS7 inter-working, ISUP, GSM MAP or ANSI-41 to PSTN and ANSI-42/GSM. The GK 210 can also function as a data call server.

As illustrated in FIG. 2, the BSC module 208 includes a cellular radio network controller (CRNC) 230 and a cellular selection/distribution unit (CSDU) 232 that are connected to a call protocol controller (CPC) 234. In turn, the CPC 234 can be connected to a plurality of base transceiver stations (BTSs) 236. Specifically, the DMS server 106 includes a BTS interface 238 at the CPC 234 that can be physically and directly connected to the BTSs 236. The CRNC 230 can provide cellular radio resource management and cellular call control. The CSDU 232 can provide Fundamental Channel (FCH) soft handoff section and distribution, Link Access Control (LAC) processing for inband signaling, multiplexer (MUX) functions, and centralized power control. Further, the CPC 234 can convert a T1 or E1 message or ATM interface to a data packet message. In a particular embodiment, each BTS 236 supports all signals and traffic up to the front point of the CPC 234, e.g., up to the BTS interface 238. Further, in a particular embodiment, the CRNC 230, the CPC 234, the CSDU 232 and the OMP 240 can perform one or more of the functions of legacy Base Station Controllers (BSC).

In an exemplary, non-limiting embodiment, the BTS interface 238 can be an IS-95A and IS-2000 interface over E1 or ATM, or the BTS interface 238 can be a GSM BTS interface using MAP or CAMEL. After reading this specification, skilled artisans will appreciate that the CPC 234 can be connected to one or more BTSs 236. FIG. 2 further shows that the BSC module 208 includes an operations, maintenance, and provisioning (OMP) module 240. In an exemplary, non-limiting embodiment, the OMP module 240 can use simple network management protocol (SNMP) for operations interfaces. Further, the OMP module 240 can include a JAVA user interface. The OMP module 240 can also include a software agent that is assigned to each component within the DMA server 106. The agents independently monitor their respective components. Moreover, each agent can provision its respective component.

Figure 3:
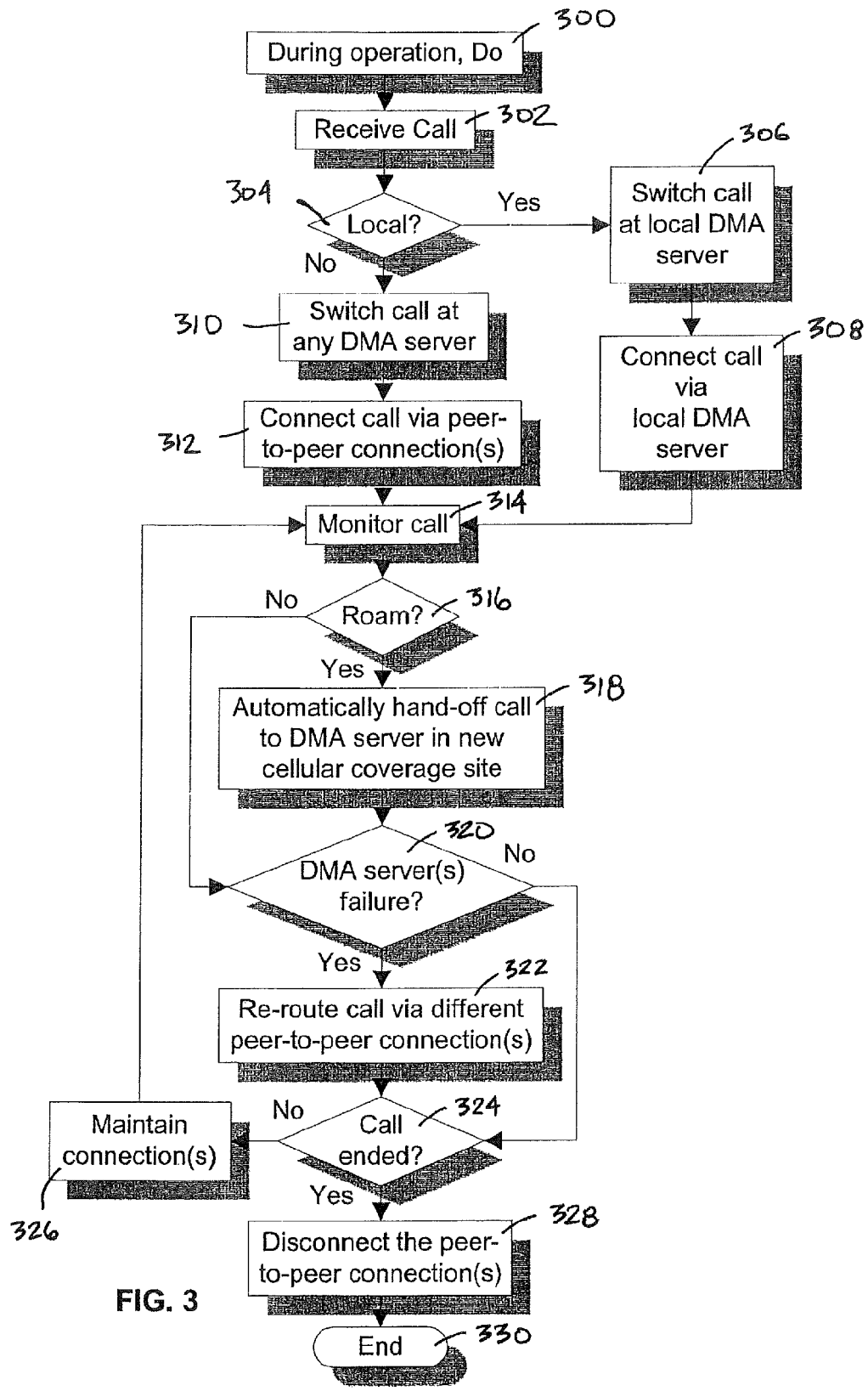
FIG. 3 is a flow chart to illustrate operating logic of a distributed management architecture server.

Referring now to FIG. 3, an exemplary, non-limiting embodiment of a flow chart is provided to illustrate operating logic of a DMA server 106 (FIG. 1). The operating logic commences at block 300 with a function loop wherein during operation, the succeeding steps are performed. At step 302, a call is received, e.g., at an antenna 104 (FIG. 1) in communication with a DMA server 106 (FIG. 1). Next, at decision step 304 it is determined whether the call is local, i.e., it is determined whether the call is between two mobile communication devices within the same cellular coverage site. If the call is local, the logic moves to block 306, and the call is switched at the local DMA server, i.e., the DMA server within the cellular coverage site in which the call is received. Then, at block 308, the call is connected from the first mobile communication device that initiated the call to a second mobile communication device via the local DMA server. Returning to decision step 304, if the call is not local, the logic proceeds to block 310 and the call is switched at the DMA server connected to the antenna 104 at which the call was received. Thereafter, at block 312, the call is connected from the first mobile communication device that initiated the call to a second mobile communication device via a peer-to-peer connection between a first DMA server and a second DMA server.

After the call is connected, either at block 308 or block 312, the logic continues to block 314 where the call is monitored. For example, the location of the first mobile communication device that initiated the call can be monitored, the location of the second mobile communication device that received the call can be monitored, the DMA server that is handling the call can be monitored, other DMA servers through which the call is connected can be monitored, and the connections (such as the peer-to-peer IP network connection) through which the call is transmitted can be monitored. Proceeding to decision step 316, it is determined if the first mobile communication device or the second mobile communication device involved in the call is roaming, i.e., moving between cellular coverage sites provided by individual antennas. If so, the logic moves to block 318 where the call at the roaming mobile communication device is automatically handed off to a new DMA server and associated antenna at a new cellular coverage site. If none of the mobile communication devices involved in the call is roaming, the logic moves to decision step 320.

At decision step 320, it is determined whether any DMA server has failed. If so, the call is re-routed around the failed DMA server by establishing one or more different peer-to-peer connections between one or more different DMA servers that are still operable. Thereafter, the logic moves to decision step 324. Decision step 324 can also be reached if it is determined that no DMA servers have failed at decision step 320. At decision step 324, it is determined whether the call has ended. If not, the logic moves to block 326 and the connection or connections through which the call has been established are maintained Otherwise, if the call has ended, the logic moves to block 328 and the peer-to-peer connection, or connections, through which the call was established are terminated, and the logic ends, at state 330.

Figure 4:
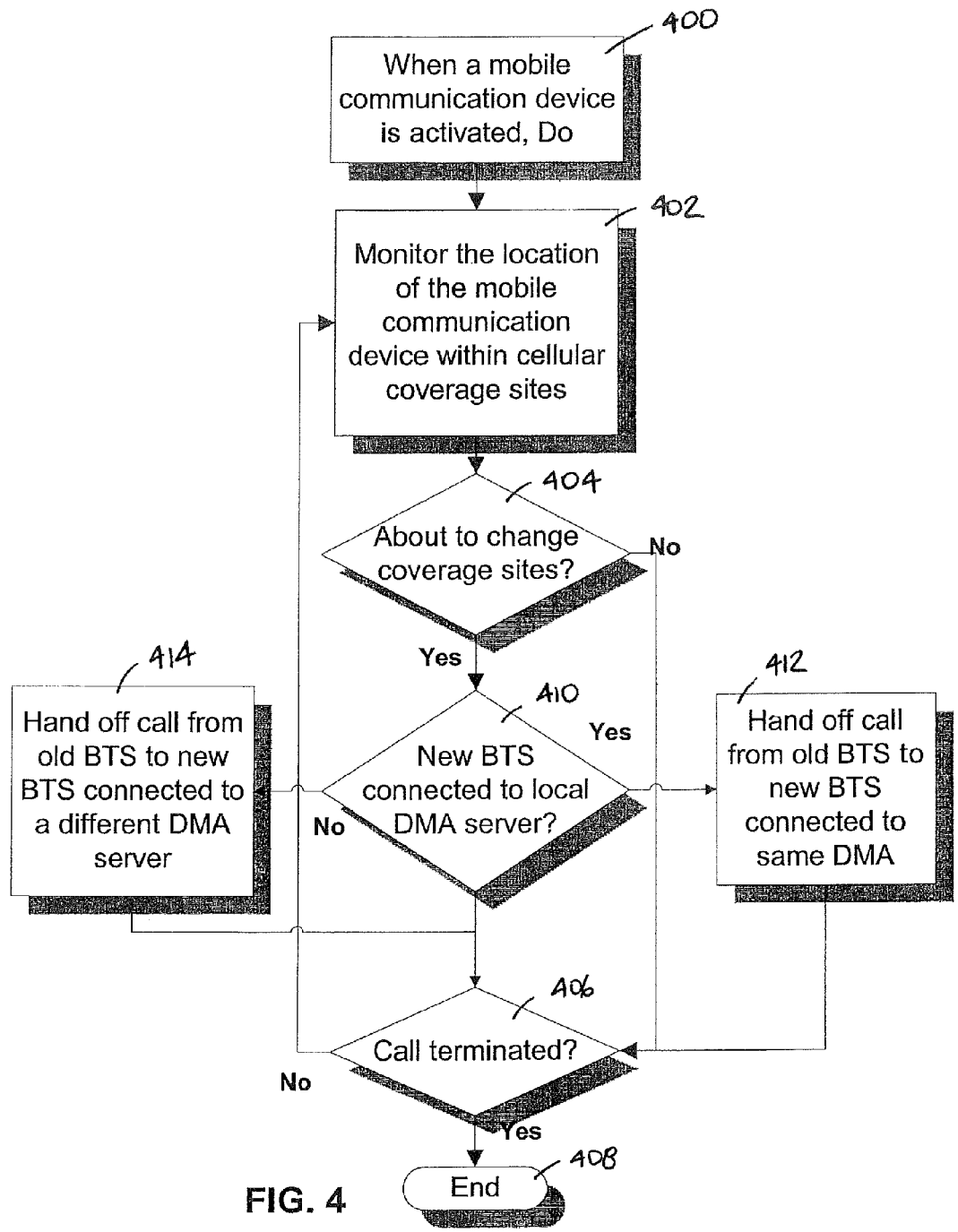
FIG. 4 is a flow chart to illustrate call hand-off logic of a distributed management architecture server.

FIG. 4 depicts a flow chart to illustrate call hand-off logic that can be performed by a DMA server 106 (FIG. 1) in order to hand off calls, or user service connections, between a first BTS and a second BTS as a mobile communication device moves between cellular coverage zones. The logic commences at block 400 with a loop wherein when a mobile communication device is activated, the following steps are performed. At block 402, the location of a mobile communication device is monitored at a local DMA server. Continuing to decision step 404, it is determined if the mobile communication device is about to move from a first cellular coverage site provided by a first BTS to a second cellular coverage site provided by a second BTS. If not, the logic moves to decision step 406 where it is determined whether the call has terminated. If the call terminates, the logic ends at state 408. On the other hand, if the call does not terminate, the logic returns to block 402 and continues as described above.

Returning to decision step 404, if the user is about to move from a first cellular coverage site provided by a first BTS to a second cellular coverage site by a second BTS, the logic proceeds to decision step 410. At decision step 410, it is determined whether the second BTS is connected locally, i.e., to the same DMS server as the first BTS. If so, the logic moves to block 412 and the DMA server hands off the call, e.g., as a soft hand off, or the user service connection, from a first BTS connected to the DMS server to a second BTS connected to the same DMS server. Conversely, if the second BTS is not local, the logic continues to block 414 where the DMS server hands off the call from a first BTS connected to the DMS server to a second BTS connected to a second DMS server. From block 412 or block 414, the logic proceeds to decision step 406 and continues as described above.

Figure 5:
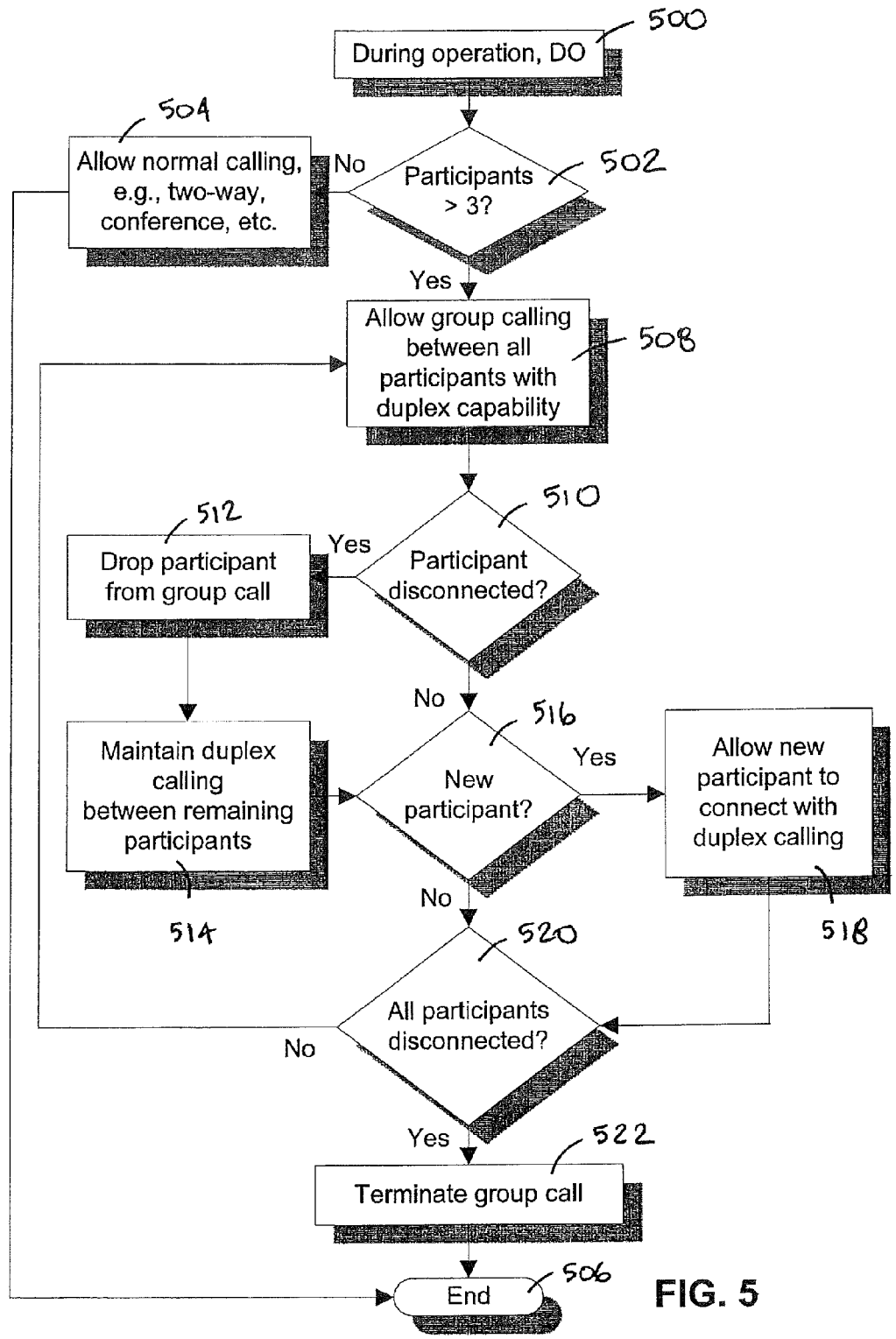
FIG. 5 is a flow chart to illustrate group call logic of a distributed management architecture server.

FIG. 5 portrays an exemplary, non-limiting embodiment of a method to illustrate group call logic that can be executed at a DMA 106 (FIG. 1) to provide a group call between several mobile communication devices and PSTN/ISDN users. At block 500, a loop is entered wherein during operation, the following steps are performed. At decision step 502, it is determined whether greater than three (3) callers are participating in a telephone call handled via one or more DMA servers 106 (FIG. 1). If not, the logic continues to block 504 and normal calling, e.g., two-way calling, three-party conference calling, etc., is allowed. The logic then ends at state 506.

At decision step 502, if greater than three (3) callers are participating in a telephone call that is handled via one or more DMA servers 106 (FIG. 1), the logic moves to block 508 and group calling is allowed between all participants with full duplex capability. Next, at decision step 510, it is determined whether one or more participants have disconnected. If so, at decision block 512, the participant or participants are dropped from the group call. At block 514, full duplex calling is maintained between the remaining group call participants. Returning to decision step 510, if no participants have disconnected, the logic proceeds to decision step 516 where it is determined whether a new participant has connected to the group call. Decision step 516 is also reached from block 514, above.

At decision step 516, if a new participant enters the group call, the new participant is allowed to connect to the group call with and may communicate with any one or more of the other participants with full duplex capability. The logic then moves to decision step 520. Decision step 520 is also reached from decision step 516 if no new participants have entered the group call. At decision step 520, it is determined whether all participants have disconnected from the group call. If not, the logic returns to block 508 and continues as described above. On the other hand, if all participants have disconnected from the group call, the logic moves to block 522 where the group call is terminated and then, ends at state 506.

Figure 6:
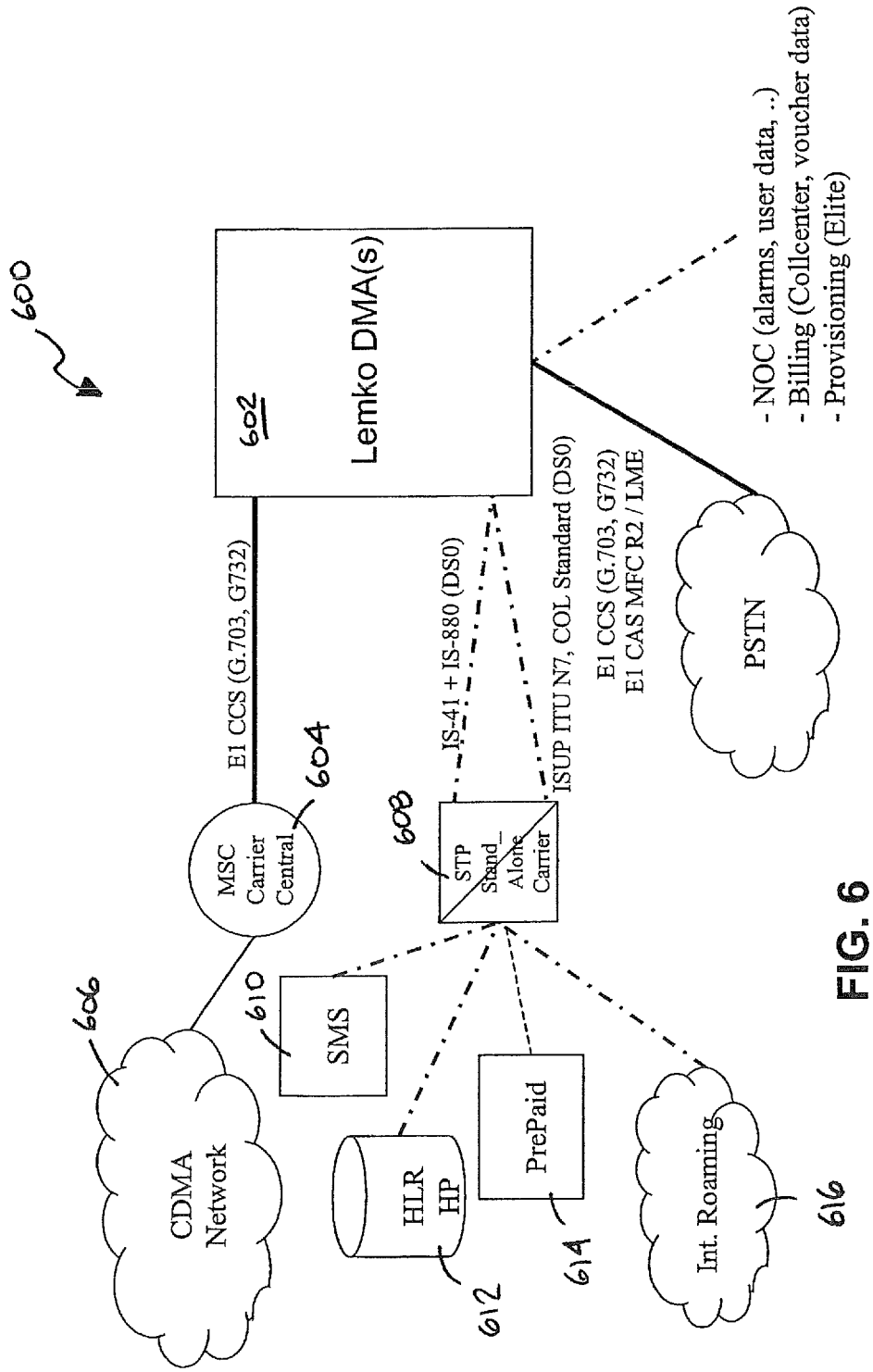
FIG. 6 is a diagram of an exemplary communication system in which a distributed management architecture server can be incorporated.

Referring now to FIG. 6, an exemplary, non-limiting embodiment of a telecommunications system is shown and is generally designated 600. As shown, the system includes one or more DMA servers 602 that are connected to a wireless carrier's central MSC 604. The DMA server(s) 602 can be connected to the MSC 604 via an E1 CCS (G.703, G732) connection, or any other applicable connection. The MSC 604, in turn, is connected to a code division multiple access (CDMA) network 606. FIG. 6 further shows that the DMA server(s) 602 can be connected to a switching transfer point (STP) 608 of a stand-alone carrier. As shown, the DMA server 602 can be connected to the STP 608 via an IS-41+IS-880 (DS0) connection, an ISUP ITU N7 connection.

As further depicted in FIG. 6, the STP 608 can be connected to a short messaging service (SMS) server 610 in order to provide text-messaging capabilities for the mobile communication devices using the system 600 shown in FIG. 6.

Additionally, the STP 608 can be connected to a home location register (HLR) 612, a pre-paid wireless server 614 and an international roaming network 616 in order to provide pre-paid services and roaming between multiple countries. FIG. 6 shows that the DMA server(s) 602 can be connected to the PTSN 618 via an E1 CCS (G.703, G732) connection, or any other appropriate connection.

Figure 7:
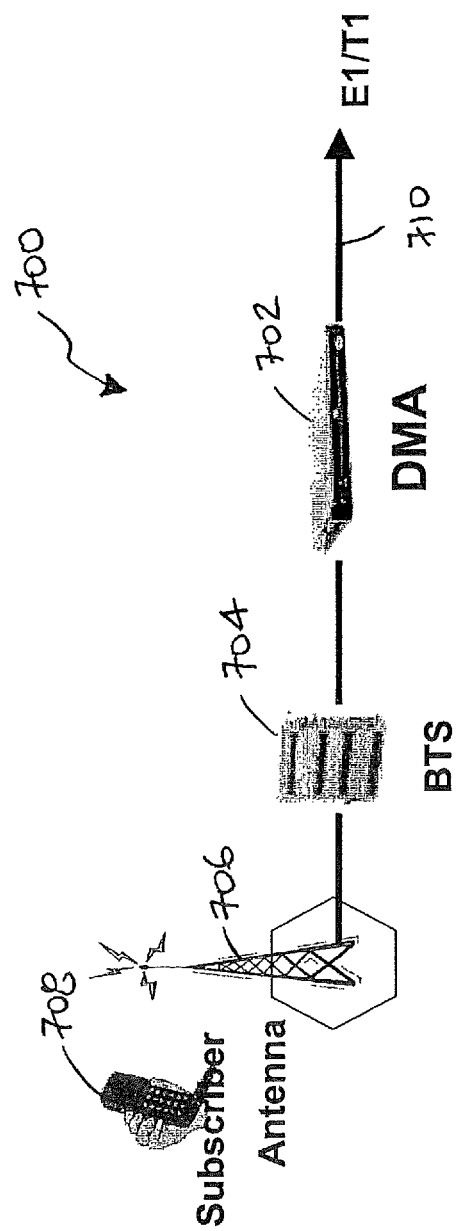
FIG. 7 is a diagram of a wireless local loop communication system in which a distributed management architecture server can be incorporated.

Referring to FIG. 7, a wireless local loop (WLL) system is portrayed and is generally designated 700. As illustrated in FIG. 7, the system 700 includes a DMA server 702 that is connected to a BTS 704. The BTS 704, in turn, is connected to an antenna 706. The antenna 706 provides cellular coverage for one or more subscribers 708 within transmission distance of the antenna 706. FIG. 7 indicates that the system 700 can further include a data network connection 710 from the DMA server 702. The data network connection 710 can connect the DMA server 702 to the PSTN via an ISUP/ISDN signaling connection on an SS7 link set or a T1/E1 wireless connection. Further, the data network connection 710 can be an IEEE 802.11 connection between the DMA server 702 depicted in FIG. 7 and other DMA servers not shown. The DMA server 702 can beneficially utilize existing infrastructure used for cellular and SMS data services.

Figure 8:
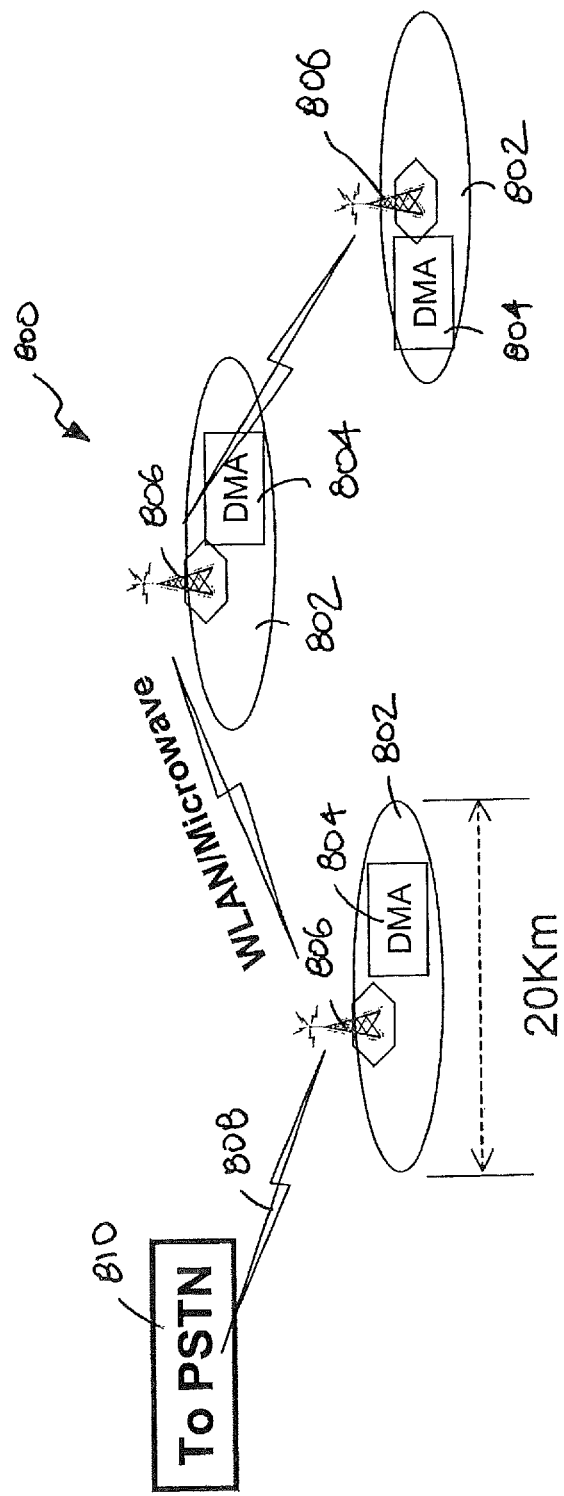
FIG. 8 is a diagram of plural wireless local loop communication systems connected to the public switched telephone network via a single back-haul connection.

FIG. 8 shows a multi-WLL system, generally designated 800. As shown, the system 800 includes a plurality of WLLs 802. Each WLL 802 can include a DMA server 804 and an antenna 806 connected thereto to provide a cellular coverage site around the antenna 806. As illustrated in FIG. 8, the WLLs 802 can be interconnected via a wireless local area network (WLAN), or a wide area network, such as a microwave connection. Moreover, a DMA server 804 within one of the WLLs 802 can provide a back-haul connection 808 to the PSTN 810. This type of deployment scenario can greatly reduce the costs associated with a wireless system. Since the DMA servers 804 are connected to each other via the WLAN or microwave connections, the relatively expensive inter-site back-haul component is removed. Further, using the hand-off logic, the DMA servers 804 can enable roaming between the WLLs 802 and can further provide roaming to an external wireless or other network.

Figure 9:
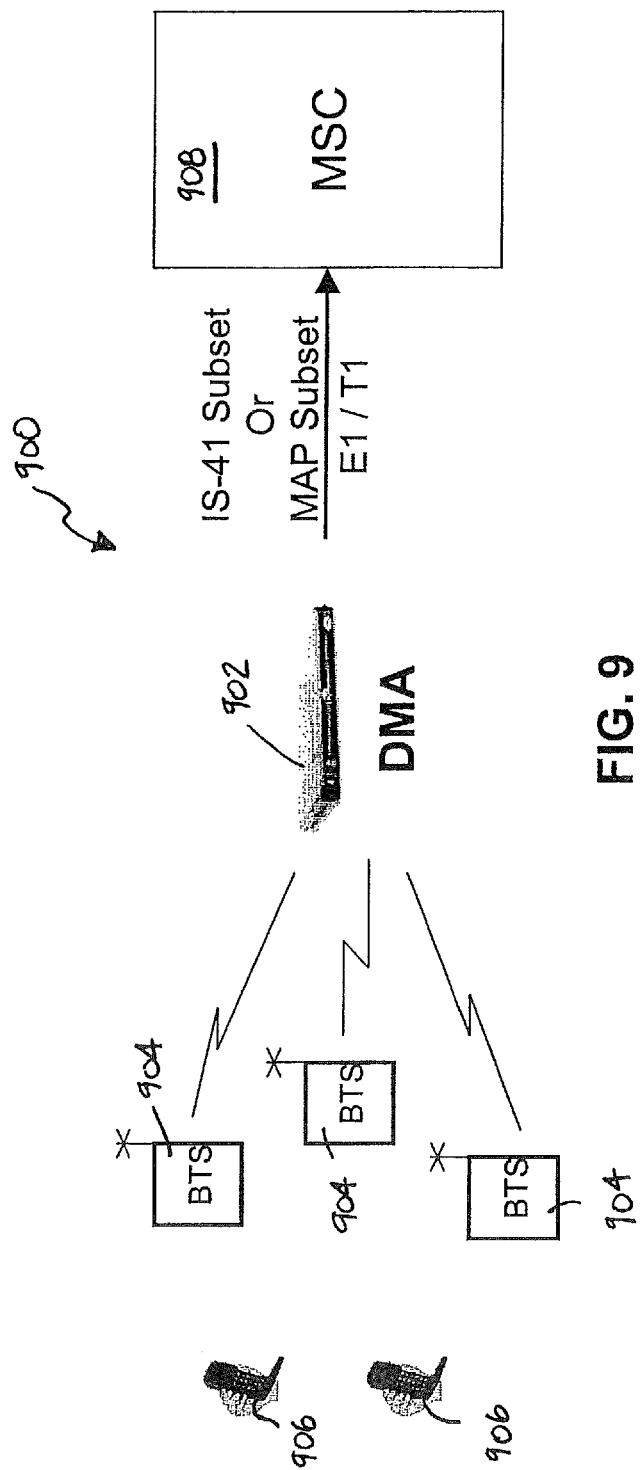
FIG. 9 is a diagram of a communication system in which a distributed management architecture server can be deployed to extend an existing cellular network.

Referring to FIG. 9, a telecommunications system is depicted and is designated 900. As illustrated in FIG. 9, the system 900 includes a DMA server 902 that can be connected to a plurality of BTSs 904. Each BTS 904 can provide cellular coverage for one or more mobile communication devices 906, e.g., one or more mobile handsets configured to communicate via the DMA server 902. FIG. 9 further shows that the DMA server 902 can be connected to an MSC 908, such as an MSC of an existing cellular system. The DMA server 902 can be connected to the MSC via an IS-41 subset or a MAP subset over a wireless E1/T1 connection. With this implementation, the DMA server 902 can extend an existing cellular network when connected to an existing cellular system MSC 908.

Figure 10:
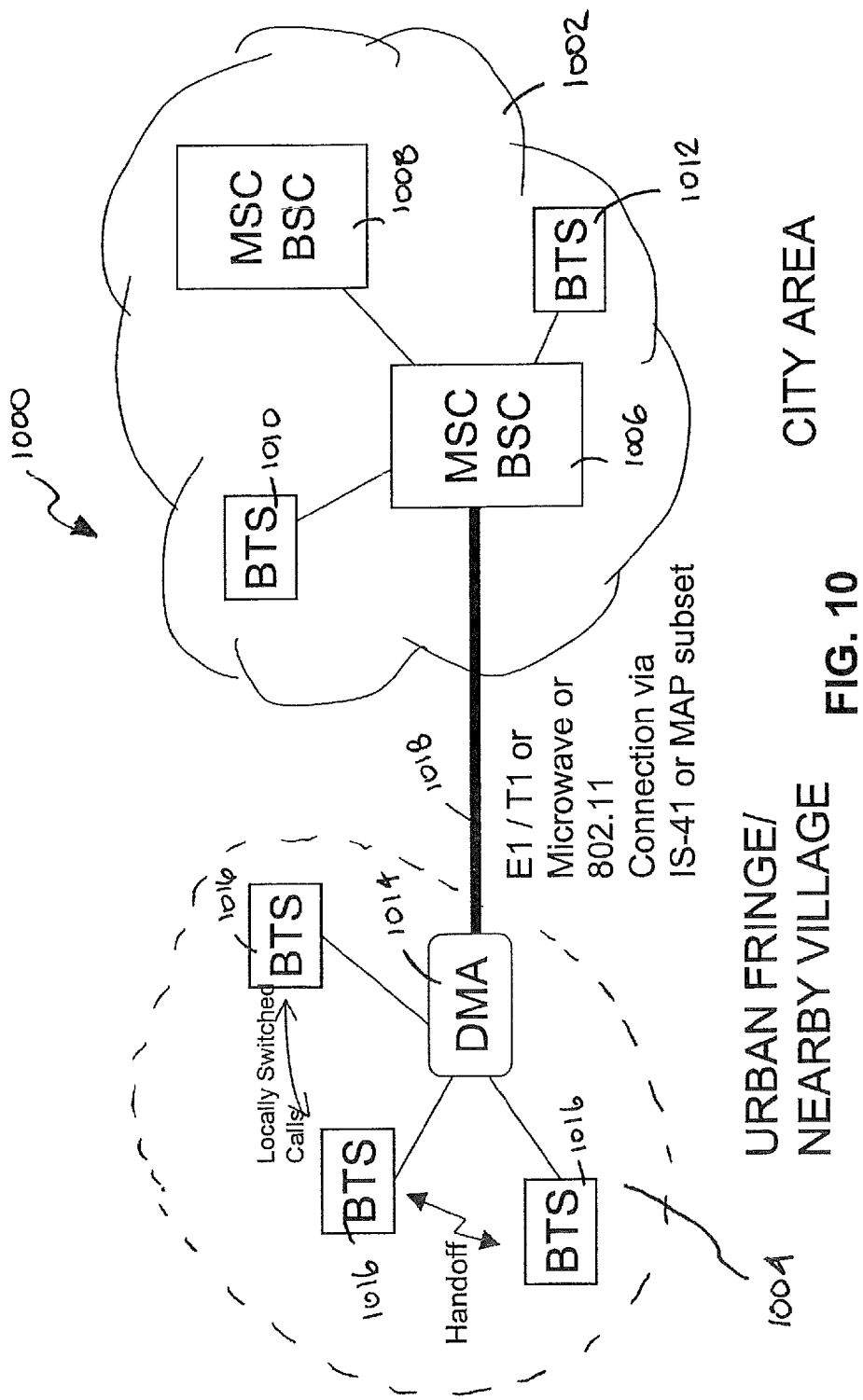
FIG. 10 is a diagram of a communication system in which a distributed management architecture server can be deployed to cover urban fringe around an existing network.

FIG. 10 shows an additional telecommunications system, generally designated 1000. As shown, the system 1000 includes a city area coverage site 1002 and an urban fringe/nearby village coverage site 1004. In an exemplary, non-limiting embodiment, the city area coverage site 1002 includes a first MSC/BSC center 1006 connected to a second MSC/BSC center 1008. Also, a first representative BTS 1010 and a second representative BTS 1012 are connected to the first MSC/BSC center 1006. The particular deployment of equipment is configured to provide adequate cellular coverage for mobile communication devices within the city area coverage site 1002.

As illustrated in FIG. 10, the urban fringe/nearby village coverage site 1004 includes a DMA server 1014 having a plurality of BTSs 1016 connected thereto. The DMA server 1014 can provide hand-off of calls between the BTSs 1016 and can switch calls made between the BTS 1016 locally. However, the DMA server 1014 within the urban fringe/nearby village coverage site 1004 can also connect telephony traffic to the first MSC/BSC center 1006 within the city area coverage site 1002 via a data network connection 1018. In one embodiment, the data network connection can be an E1 connection, a T1 connection, a microwave connection, or an 802.11 connection established via an IS-41 subset or MAP subset. The deployment of a DMA server 1014 in a location such as that described above, i.e., in urban fringe or in a nearby village, and the connection of the DMA server 1014 to an MSC/BSC center 1006 in a city area, can provide potential wireless customers that typically would not receive cellular coverage from the city area cellular coverage site 1002, can have access to wireless communication service and can further communicate with wireless customers within the city area cellular coverage site 1002.

Figure 11:
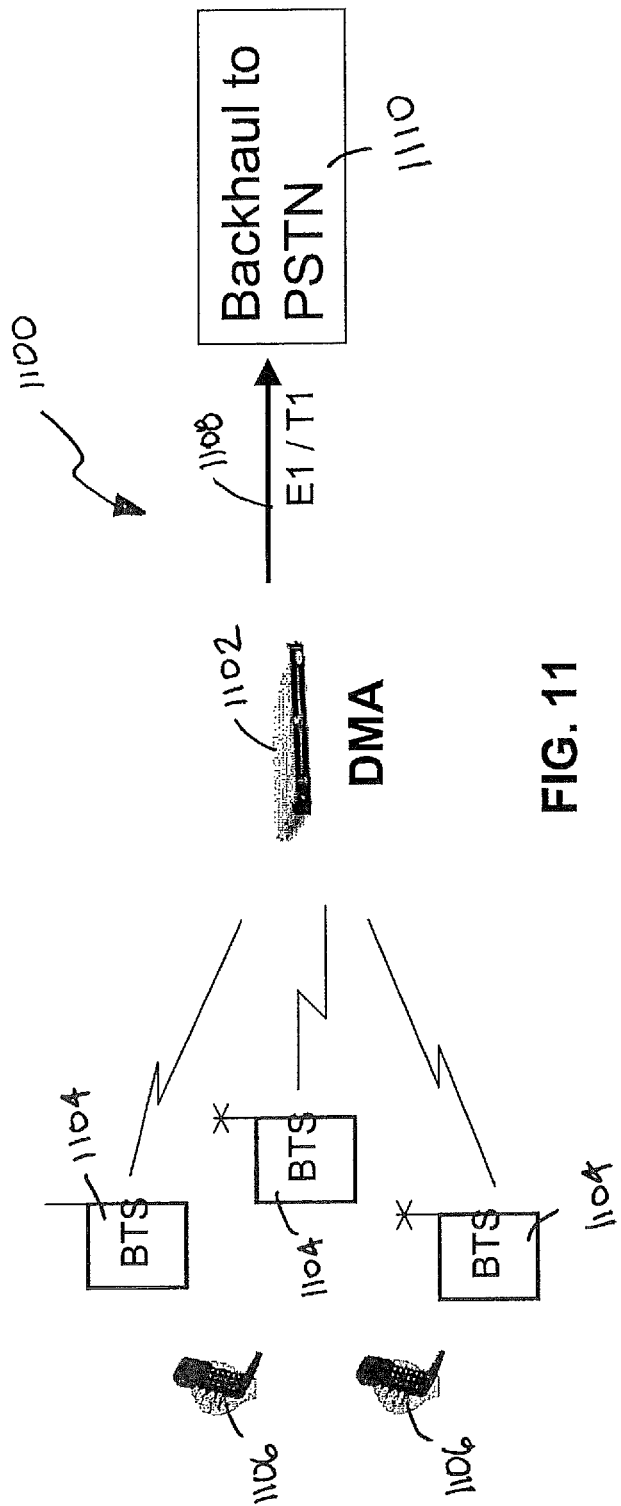
FIG. 11 is a diagram of a communication system in which a single distributed management architecture server can be connected to plural base transceiver stations and can provide a single backhaul to the public switched telephone network.

Referring now to FIG. 11, another telecommunications system is depicted and is designated 1100. As illustrated in FIG. 11, the system 1100 includes a DMA server 1102 that can be connected to a plurality of BTSs 1104. Each BTS 1104 can provide cellular coverage for one or more mobile communication devices 1106. FIG. 11 further shows that the DMA server 1102 can include a data network connection 1108 that provides a back-haul connection to the PSTN 1110. In one embodiment, the data network connection can be an E1 connection, a T1 connection, a cable connection, a microwave connection, or a satellite connection. Moreover, the system 1100 depicted in FIG. 11 can be deployed using CDMA IS-95, CDMA 1X, GSM/GPRS, W-CDMA, or other industry standard technologies.

Using a single back-haul connection greatly minimizes costs associated with the wireless communication network. Further, the system 1100 shown in FIG. 11 can be deployed relatively rapidly and can be maintained remotely. Additionally, with the inclusion of the OMP module 232 (FIG. 2) and the AAA module 222 (FIG. 2), subscriber accounts can be managed locally and billing can be performed locally, i.e., within the DMA server 1102. Moreover, as subscribers increase, the size of the system can be increased modularly, e.g., by adding DMA servers, corresponding BTSs, and the appropriate connections.

Figure 12:
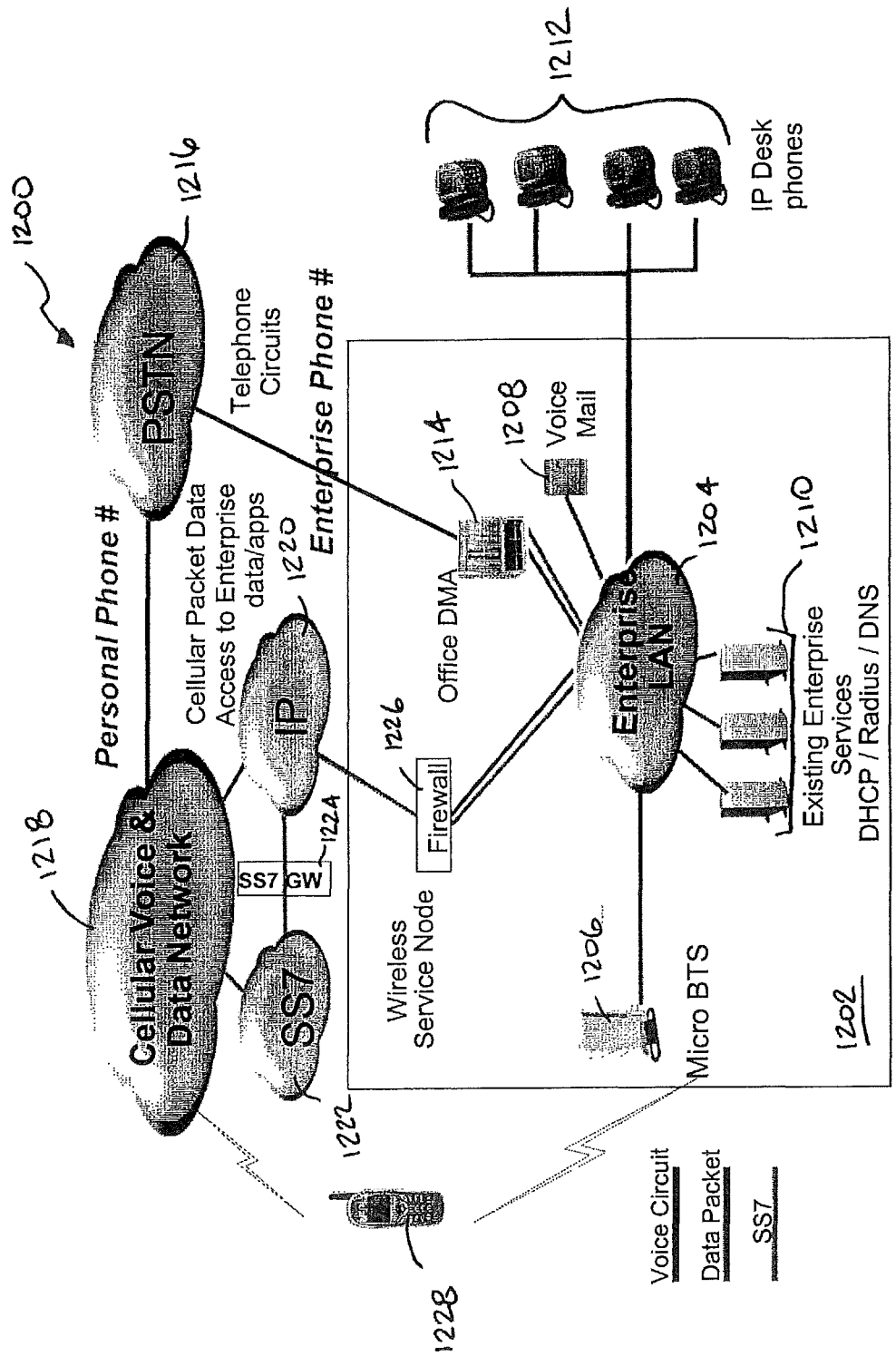
FIG. 12 is a diagram of an in-building communication system in which a distributed management architecture server can be deployed.

FIG. 12 illustrates an in-building telecommunications network that is generally designated 1200. FIG. 12 depicts a structure 1202, e.g., an office building, a commercial building, a house, etc. An enterprise local area network (LAN) 1204 is installed within the building 1202. A micro-BTS 1206 is connected to the enterprise LAN 1204. Moreover, a voice mail server 1208 and plural enterprise services servers 1210 are connected to the enterprise LAN 1204. In an exemplary, non-limiting embodiment, the enterprise services servers 1210 can include a dynamic host configuration protocol (DHCP) server, a radius server, a domain name server (DNS), etc. As depicted in FIG. 12, a plurality of phones 1212, e.g., IP desk phones, can be connected to the enterprise LAN 1204.

FIG. 12 further indicates that an office DMA server 1214 can be connected to the enterprise LAN 1204. The office DMA server 1214 can also be connected to the PSTN 1216, which, in turn, can be connected to a cellular voice and data network 1218. The enterprise LAN 1204 can also be connected to the cellular voice and data network 1218 via an Internet protocol (IP) network 1220. A signaling system seven (SS7) network 1222 can be connected to the cellular voice and data network 1218 and the IP network 1220. FIG. 12 also depicts an SS7 gateway 1224 between the SS7 network 1222 and the IP network 1220 and a firewall 1226 between the enterprise LAN 1204 and the IP network 1220. FIG. 12 shows a wireless communication device 1228 in communication with the cellular voice and data network 1218 and the micro-BTS 1206.

Figure 13:
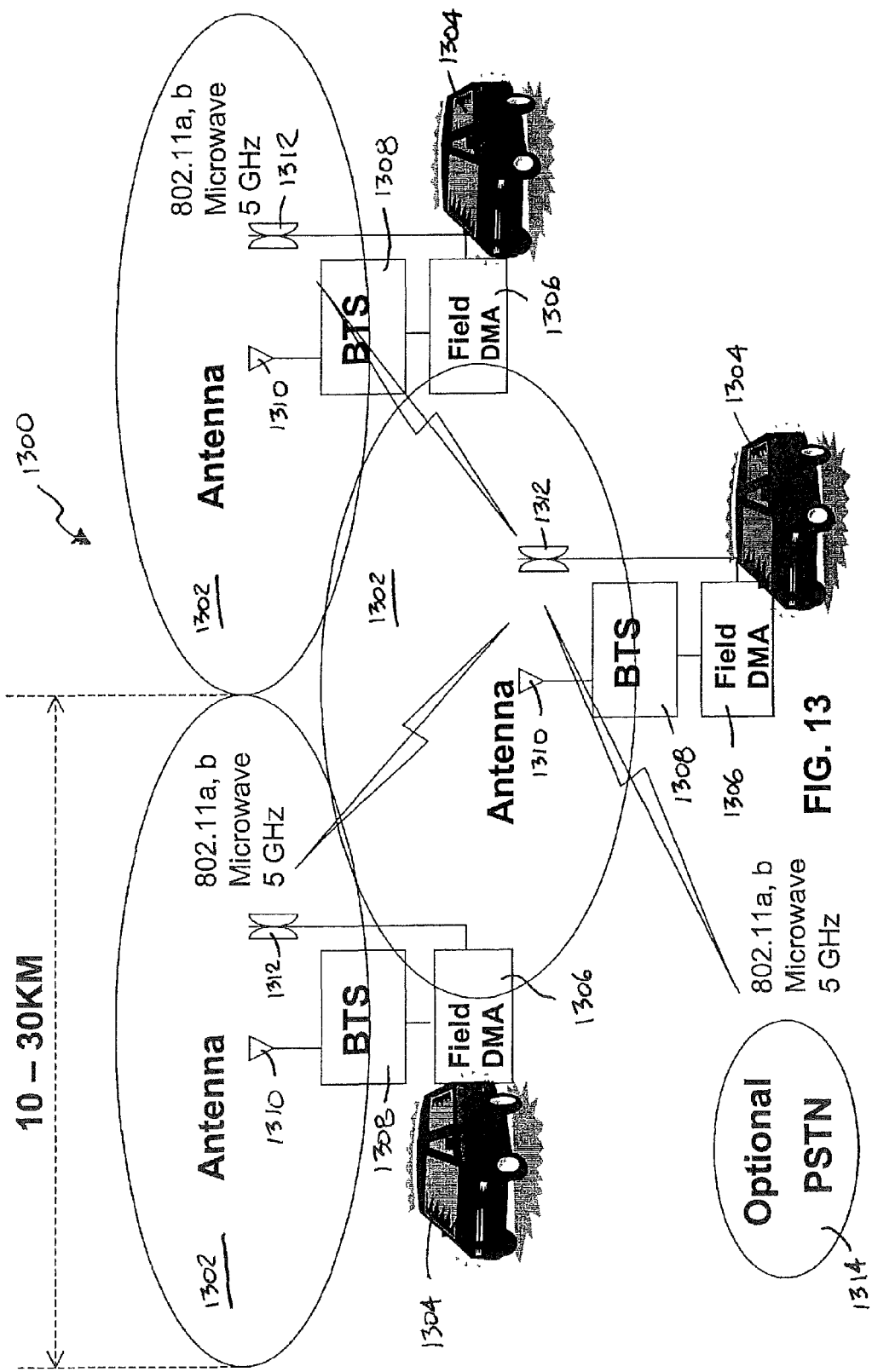
FIG. 13 is a diagram of a mobile in-field communication system in which multiple distributed management architecture servers can be deployed via multiple vehicles.

Referring now to FIG. 13, a mobile in-field telecommunications system is depicted and is generally designated 1300. As depicted, the system 1300 includes a plurality of mobile cellular coverage sites 1302. Each mobile cellular coverage site 1302 includes a vehicle 1304 in which a field DMA server 1306 is disposed. Moreover, a BTS 1308 is disposed within each vehicle 1304 and is in direct physical connection with the field DMA server 1306, e.g., by a wire or cable connected there between. The field DMA server 1306 and the BTS 1308 can be removably installed within the vehicle 1304 or permanently affixed therein. FIG. 13 further indicates that each BTS 1308 can include an antenna 1310 that is designed to communicate with mobile communication devices. Also, each field DMA server 1306 includes an antenna 1312. In an exemplary, non-limiting embodiment, the field DMA servers 1306 can communicate wirelessly with each other via the antennae 1312, e.g., via 802.11a, 802.11b, microwaves, or other wireless link.

The mobile cellular coverage sites 1302 can be deployed to provide a temporary web of cellular coverage for a plurality of mobile communication devices, e.g., devices carried by solders during a battle. The mobile in-field communications system 1300 can be recalled, moved, and re-deployed as necessary. Further, the system can include a wireless connection, e.g., 802.11a, 802.11b, microwaves, to the PSTN 1314.

Figure 14:
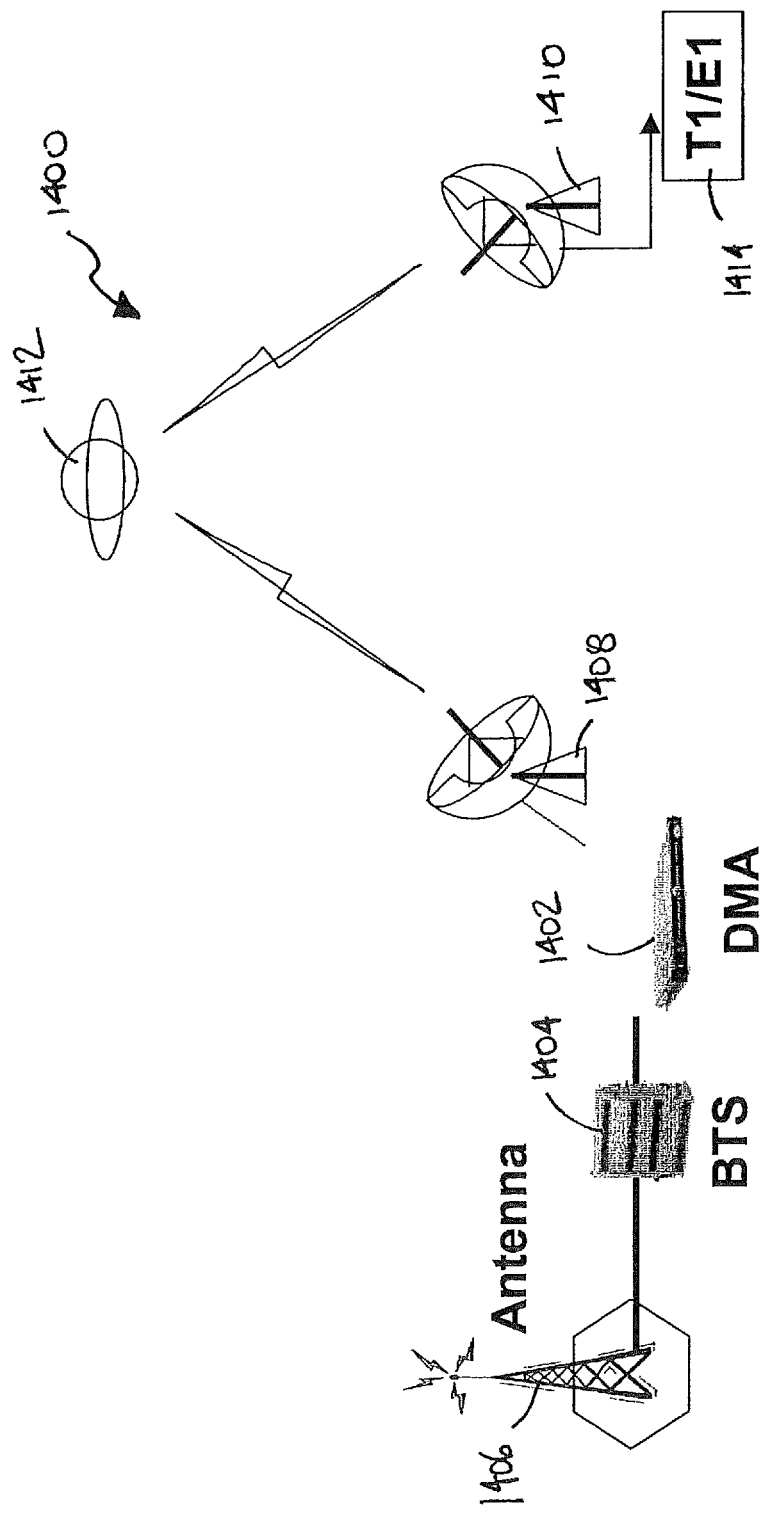
FIG. 14 is a diagram of a communication system in which a distributed management architecture server can utilize a satellite connection as a backhaul connection.

Referring to FIG. 14, still another telecommunications system is illustrated and is generally designated 1400. As depicted in FIG. 14, the system 1400 includes a DMA server 1402 that is connected to a BTS 1404. The BTS 1404, in turn, is connected to an antenna 1406. FIG. 14 further illustrates that a first satellite transceiver 1408 is also connected to the DMA server 1402. The first satellite transceiver 1408 communicates with a second satellite transceiver 1410 via a satellite 1412. Additionally, the second satellite transceiver 1410 includes a data network connection 1414, e.g., a T1 connection, or an E1 connection. The satellite transceivers 1408, 1410 and the satellite 1412 can provide a backhaul connection for the DMA server 1402. Or, the satellite transceivers 1408, 1410 and the satellite 1412 can connect the DMA server 1402 to an additional DMA server (not shown).

Figure 15:
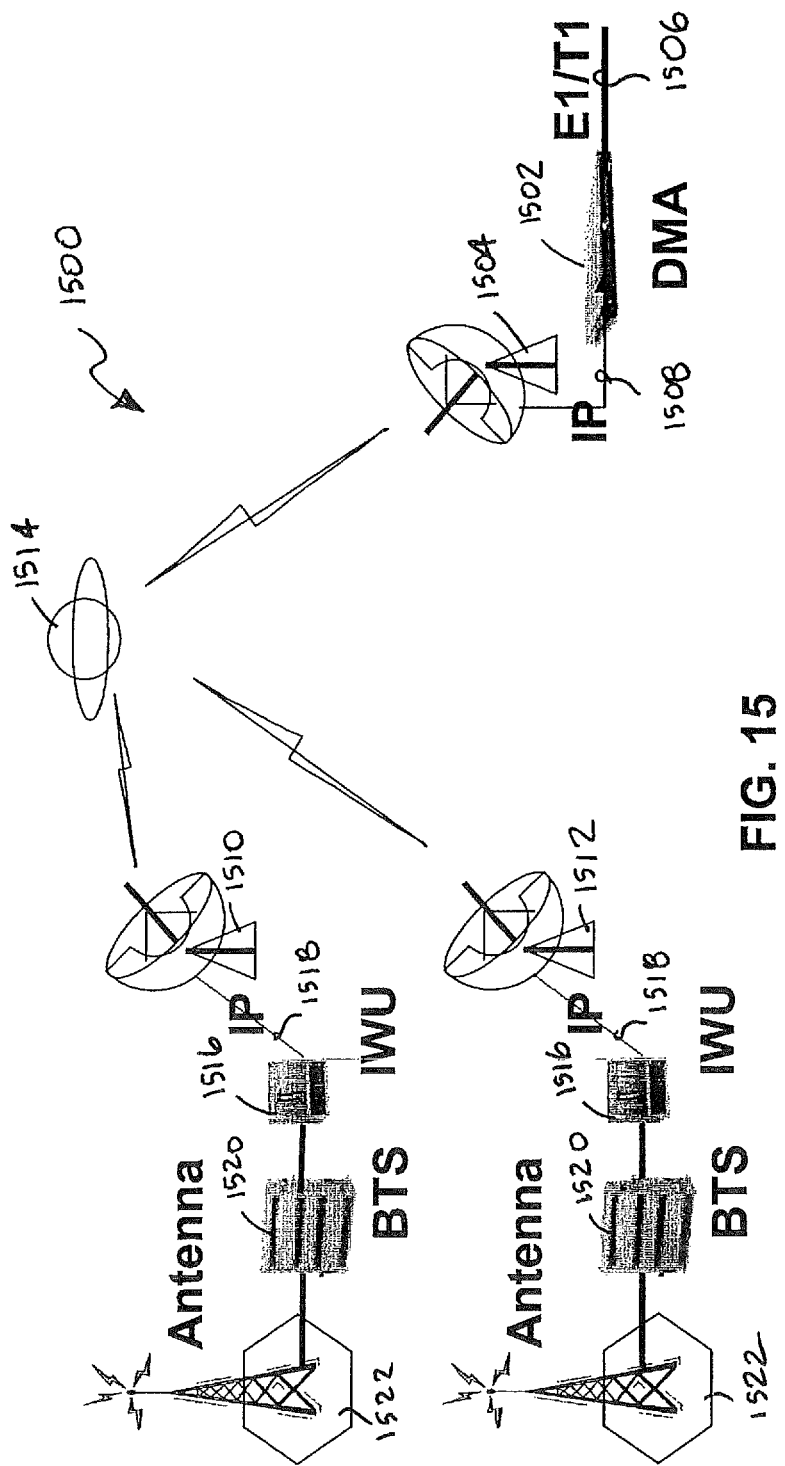
FIG. 15 is a diagram of a communication system in which a distributed management architecture server can receive multiple backhaul signals via multiple satellite signals.

FIG. 15 shows yet another telecommunications system that is generally designated 1500. As illustrated in FIG. 15, the system includes a DMA 1502 that is connected to a first satellite transceiver 1504. Moreover, the DMA 1502 includes a primary network connection 1506, e.g., a T1 connection, or an E1 connection, and a secondary network connection 1508, e.g., an IP connection. FIG. 15 shows that the first satellite transceiver 1504 communicates with a second satellite transceiver 1510 and a third satellite transceiver 1512 via a satellite 1514. Each of the second and third satellite transceivers 1510, 1512 is connected to an interworking unit (IWU) 1516 via a data network connection 1518, e.g., an IP connection. Each IWU 1516 is connected to a BTS 1520, which in turn, is connected to an antenna 1522. The satellite transceivers 1504, 1510, 1512 provide an IP network extension for the DMA server 1502. Moreover, in the deployment illustrated in FIG. 15, the DMA server 1502 can act as a centralized micro-switch for handling calls received at the antennas 1522 and transmitted via the second and third satellite transceivers 1510, 1512.

Figure 16:
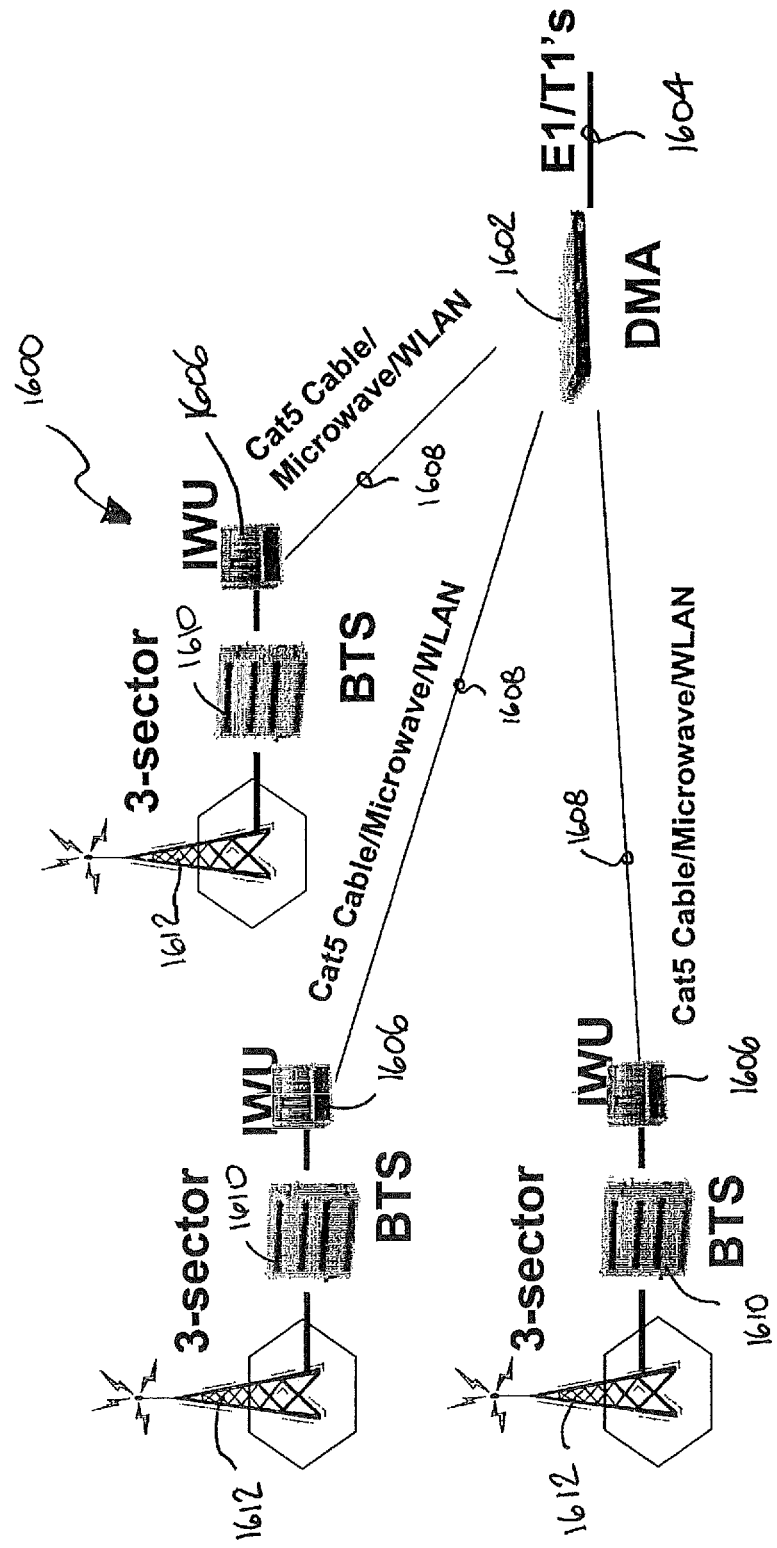
FIG. 16 is a diagram of a communication system in which a single distributed management architecture server can be connected to multiple base transceiver stations.

Referring now to FIG. 16, another telecommunications system is depicted and is designated 1600. As shown, the system 1600 includes a DMA server 1602 having a primary network connection 1604. Moreover, the DMA server 1602 can be connected to a plurality of IWUs 1606. In an exemplary, non-limiting embodiment, the DMA server 1602 can be connected to each IWU 1606 via a secondary network connection 1608, such as a category five (Cat 5) cable connection, a microwave connection, or a WLAN connection. Further, each IWU 1606 is connected to a BTS 1610 and each BTS 1610, in turn, is connected to an antenna 1612. Each BTS 1610 can be a 3-sector BTS. In the deployment depicted in FIG. 16, the DMA server 1602 can act as a centralized micro-switch that can be used to handle telephony traffic received at the antennae 1612.

With the configuration of structure described above, the present disclosure provides a flexible telecommunications device, i.e., the DMA server 106 (FIG. 1), that is distributive and associative, i.e., it can operate stand-alone or seamlessly within an existing cellular network. Moreover, the DMA server 106 can be integrated with virtually any third party base station. The DMA server 106 can operate with any air interface including CDMA IS-95, CDMA 1X, CDMA EVDO, GSM, GPRS, W-CDMA, 802.11 (Wi-fi), 802.16 (Wi-fi), etc. Further, the DMA server 106 can provide integrated prepaid billing, OAMP, network management, and AAA functionality. The DMA server 106 can include a Java based user interface and feature configuration system. Also, the DMA server 106 can provide real time call metering, call detail record (CDR) generation, and real time call provisioning. The DMA server 106 may be implemented in a relatively small footprint and a relatively low power requirement. Further, the DMA server 106 may be implemented using inexpensive and widely available computer equipment.

With one or more of the deployment configurations described above, the present system provides mobile to landline calls from mobile handsets within a DMA server cellular coverage area. Also, mobile to landline calls can be made from mobile handsets roaming into DMA coverage areas. Mobile to mobile calls can be made from home/roaming handsets to DMA handsets and vice versa. Further, mobile to IP calls and IP to mobile calls can be made from within a DMA server coverage area. IP to IP calls can be made from any DMA handset to any IP phone. Additionally, IP to landline calls and landline to IP calls can be made from a DMA handset to any phone. And, land to mobile calls to DMA handsets can be made.

The systems described above can support call forwarding, call waiting, 3-way calling caller ID, voice mail, and mobile to mobile SMS service, i.e., text messaging. Further, the systems described above can provide broadcast SMS service, mobile to land high-speed IP data (1X or GPRS) service and mobile-to-mobile high speed IP data (1X or GPRS) service. Also, the systems described above can provide IP-PBX capability.

Further, one or more of the illustrated systems can provide IP transport between distributed elements, e.g., DMA servers 106 (FIG. 1). Packet back-haul from BTS to RAN can be provided. Further, the control logic within the DMA servers 106 (FIG. 1) can be distributed and associated. Associated systems can be redundant, self-healing, self-organizing, and scalable. Distributed systems can be "snap-together," i.e., a DMA server 106 (FIG. 1) can be linked to a previously deployed DMA server 106 (FIG. 1) in order to broaden, or otherwise extend, cellular coverage. Further, distributed systems can be de-centralized to avoid single points of failure.

One or more of the systems described above can also provide soft and softer call handoffs on the same frequency interfaces. Also, soft handoffs can be provided on different systems. Further, a DMA based system can operate stand-alone with a billing system provided by a DMA server and CDR generation. Or, a system can use the SS7 network to pass CDRs to a central switch for integrated billing and operation with an existing network.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving a call at a distributed mobile architecture (DMA) server, wherein the DMA server includes a mobile switching center (MSC) module, a wireless transceiver, and a base station controller (BSC), wherein the MSC module includes an authentication, authorization, and accounting (AAA) module configured to support generation of call detail records at the DMA server;
routing the call from the DMA server to a communication device; and
generating a call detail record associated with the call at the DMA server.

2. The method of claim 1, further comprising determining whether the communication device is within a coverage area associated with the DMA server.

3. The method of claim 2, wherein the call is routed to the communication device via the DMA server in response to determining that the communication device is within a coverage area associated with the DMA server.

4. The method of claim 2, wherein the DMA server is connected to another DMA server via a peer-to-peer internet protocol (IP) network connection.

5. The method of claim 4, further comprising determining whether the communication device is within another coverage area associated with the other DMA server.

6. The method of claim 5, wherein the call is routed via the peer-to-peer IP network connection to the other DMA server and to the communication device in response to determining that the communication device is within the other coverage area associated with the other DMA server.

7. The method of claim 1, further comprising monitoring the call via the DMA server.

8. The method of claim 7, wherein monitoring the call comprises monitoring a location of a calling communication device, a location of the communication device, a status of the DMA server, a status of another DMA server, a peer-to-peer internet protocol (IP) connection between the DMA server and the other DMA server, or any combination thereof.

9. The method of claim 8, wherein monitoring the call further comprises:
determining whether a calling communication device is roaming; and
determining whether the communication device is roaming,
wherein the call record is generated based on information obtained during the monitoring of the call.

10. The method of claim 1, further comprising sending the call detail record to a second location.

11. The method of claim 1, wherein a subscriber is billed based on the call detail record.

12. A non-transitory computer-readable storage medium comprising instructions that, when executed by a processor, cause the processor to:

receive a call at a distributed mobile architecture (DMA) server, wherein the DMA server includes a mobile switching center (MSC) module, a wireless transceiver, and a base station controller (BSC), wherein the MSC module includes an authentication, authorization, and accounting (AAA) module configured to support generation of call detail records at the DMA server;

route the call from the DMA server to a communication device; and generate a call detail record associated with the call at the DMA server.

13. The non-transitory computer-readable storage medium of claim 12, further comprising instructions that, when executed by the processor, cause the processor to monitor the call.

14. The non-transitory computer-readable storage medium of claim 13, wherein monitoring the call comprises monitoring a location of a calling communication device, a location of the communication device, a status of the DMA server, a status of another DMA server, a peer-to-peer interne protocol (IP) connection between the DMA server and the other DMA server, or any combination thereof.

15. The non-transitory computer-readable storage medium of claim 14, further comprising instructions that, when executed by the processor, cause the processor to:

determine whether a calling communication device is roaming; and determine whether the communication device is roaming.

16. The non-transitory computer-readable storage medium of claim 14, wherein the call record is generated based on information obtained during the monitoring of the call.

17. An apparatus comprising:

a distributed mobile architecture (DMA) server comprising:
- a wireless transceiver;
- a computer-readable storage medium;
- a mobile switching center (MSC) module embedded in the computer-readable storage medium, wherein the MSC module includes an authentication, authorization, and accounting (AAA) module, the AAA module configured to support generation of call detail records at the DMA server; and
- a base station controller (BSC) module embedded in the computer readable storage medium.

18. The apparatus of claim 17, wherein the DMA server is configured to:

receive a call from a calling communication device;

route the call to a destination communication device; and generate a call detail record associated with the call.

19. The apparatus of claim 18, wherein the DMA server is configured to monitor the call.

20. The apparatus of claim 19, wherein the call record associated with the call is generated based on information obtained during the monitoring of the call, wherein the information obtained during the monitoring of the call includes at least one of a location of the calling communication device, a location of the destination communication device, a status of the DMA server, a status of another DMA server, a peer-to-peer internet protocol (IP) connection between the DMA server and the other DMA server, or any combination thereof.

\* \* \* \* \*